(12) United States Patent
Miyazawa et al.

(10) Patent No.: US 9,460,535 B2
(45) Date of Patent: Oct. 4, 2016

(54) INFORMATION PROCESSING DEVICE, INFORMATION PROCESSING METHOD, AND PROGRAM

(71) Applicant: Sony Corporation, Tokyo (JP)

(72) Inventors: Yusuke Miyazawa, Tokyo (JP); Shoichiro Moriya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/372,905

(22) PCT Filed: Dec. 27, 2012

(86) PCT No.: PCT/JP2012/083820
§ 371 (c)(1),
(2) Date: Jul. 17, 2014

(87) PCT Pub. No.: WO2013/118417
PCT Pub. Date: Aug. 15, 2013

(65) Prior Publication Data
US 2015/0009231 A1    Jan. 8, 2015

(30) Foreign Application Priority Data

Feb. 10, 2012 (JP) ................ 2012-027027

(51) Int. Cl.
| | |
|---|---|
| *G06T 11/60* | (2006.01) |
| *G06F 3/0485* | (2013.01) |
| *G09G 5/34* | (2006.01) |
| *G06F 3/0488* | (2013.01) |
| *G06F 3/0481* | (2013.01) |

(52) U.S. Cl.
CPC ............ *G06T 11/60* (2013.01); *G06F 3/0485* (2013.01); *G06F 3/0488* (2013.01); *G06F 3/04812* (2013.01); *G09G 5/34* (2013.01); *G06T 2200/16* (2013.01)

(58) Field of Classification Search
None
See application file for complete search history.

(56) References Cited

U.S. PATENT DOCUMENTS

| | | | | |
|---|---|---|---|---|
| 2013/0083071 A1* | 4/2013 | Nakamura | ............... | G09G 5/14 345/636 |
| 2015/0309718 A1* | 10/2015 | Sidman | ................. | G06F 3/0481 715/788 |
| 2016/0098187 A1* | 4/2016 | Kim | .................... | G06F 3/04817 715/800 |

FOREIGN PATENT DOCUMENTS

| | | |
|---|---|---|
| JP | 2003-186594 | 7/2003 |
| JP | 2006-318210 | 11/2006 |
| JP | 2007-080298 | 3/2007 |
| JP | 2007-149313 | 6/2007 |
| JP | 2012-003579 | 1/2012 |

* cited by examiner

*Primary Examiner* — Chante Harrison
(74) *Attorney, Agent, or Firm* — Paratus Law Group, PLLC

(57) ABSTRACT

Provided is an information processing device including an obtaining section configured to obtain a commonly-displayed object which is commonly displayed before and after a display state is updated, a layout determination section configured to determine a display position of the commonly-displayed object on a display screen after an operation of changing the display state based on a direction of the operation, and an image generating section configured to generate a display image including the commonly-displayed object at the determined display position.

14 Claims, 21 Drawing Sheets

FIG. 8
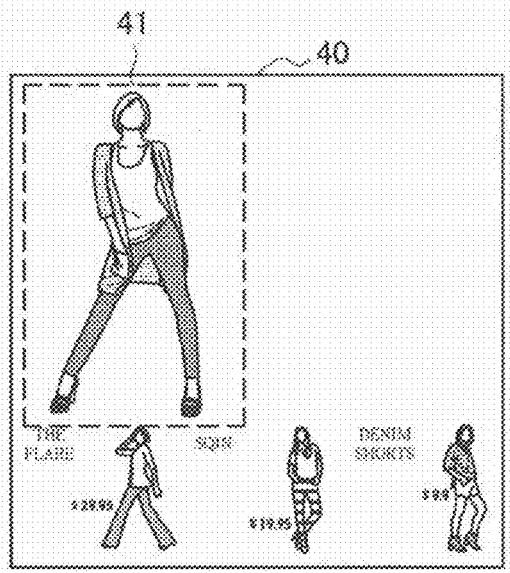 
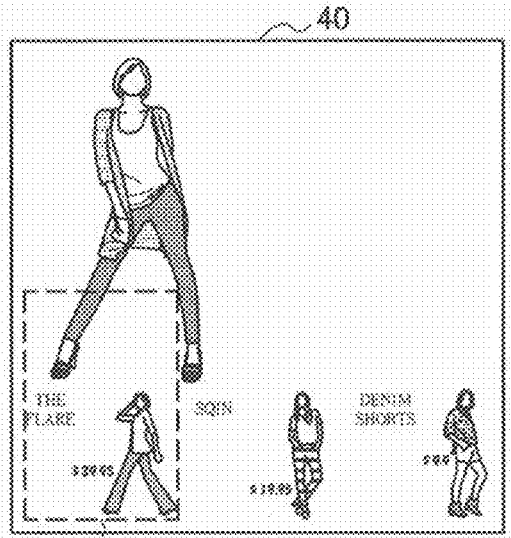 

FIG. 9
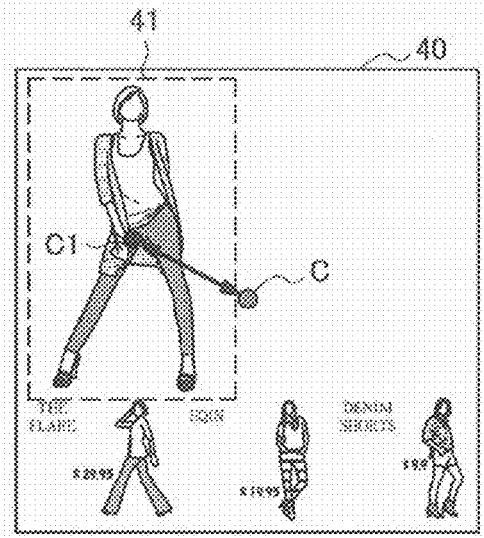
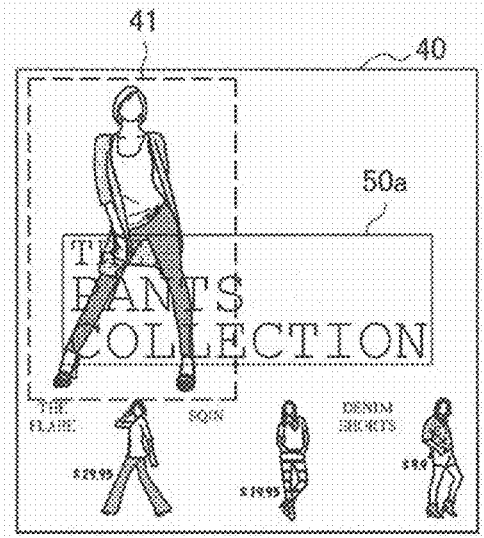
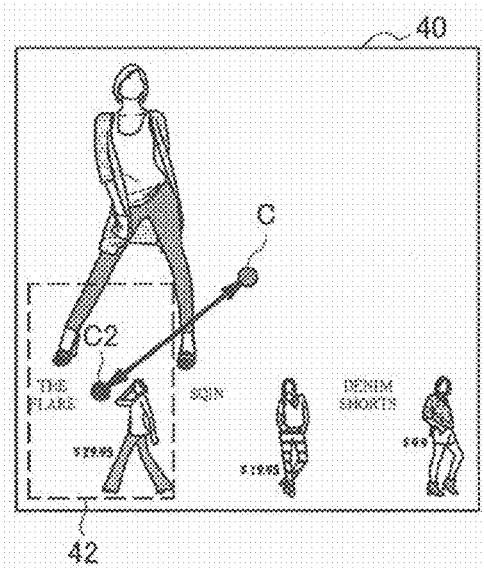
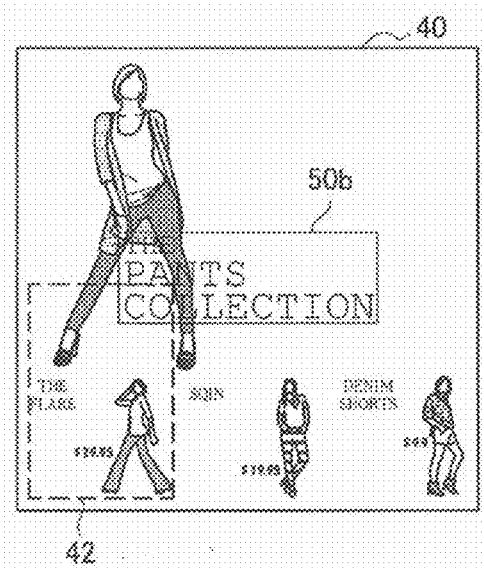

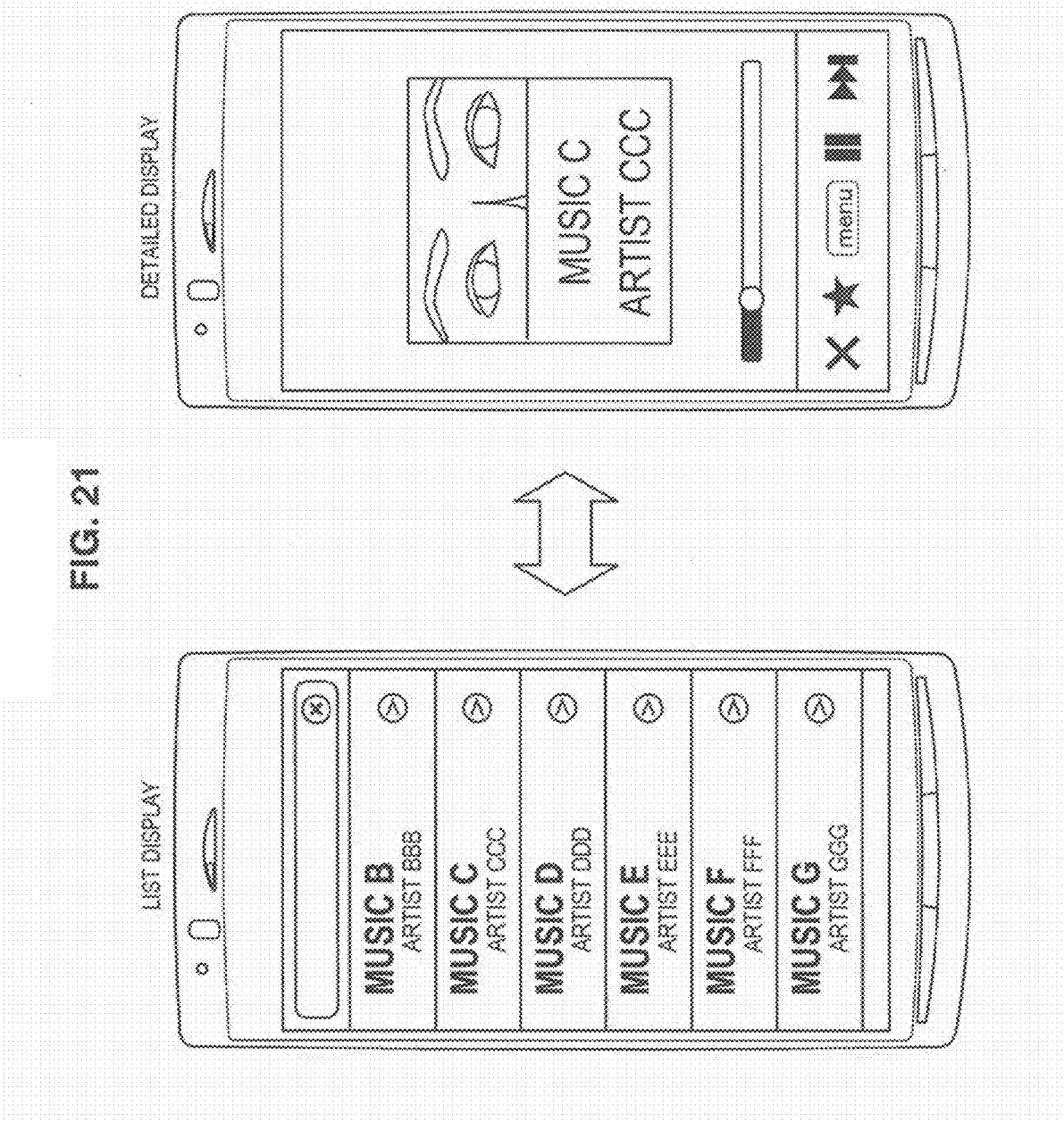

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2012/083820 (filed on Dec. 27, 2012) under 35 U.S.C. §371, which claims priority to Japanese Patent Application No. 2012-027027 (filed on Feb. 10, 2012), which are all hereby incorporated by reference in their entirety.

TECHNICAL FIELD

The present disclosure relates to an information processing device, information processing method, and a program.

BACKGROUND ART

There is a limit to the size of a display screen for displaying information. In order to display a large amount of information on this display screen, a portion of the image is displayed in some cases. A user can view the information while changing an area of the information to be displayed by using a combination of a scroll operation, an enlarging operation, a reducing operation, etc., for example.

However, when one attempts to view detailed information, it is difficult to grasp an overall picture of the information, and it is difficult to know which part of the entire information corresponds to the part of the information that is being currently viewed. In view of this, Patent Literature 1, for example, discloses a player device which switches between a screen displaying a list of content items and another screen displaying detailed information of a content item being currently replayed.

CITATION LIST

Patent Literature

Patent Literature 1: JP 2007-149313A

SUMMARY OF INVENTION

Technical Problem

However, if the screen is switched in order to obtain an overview characteristic, the burden of the user operation increases.

In view of the above, it is preferred that one can know the position of the information being currently displayed without switching the screen.

Solution to Problem

According to the present disclosure, there is provided an information processing device including an obtaining section configured to obtain a commonly-displayed object which is commonly displayed before and after a display state is updated, a layout determination section configured to determine a display position of the commonly-displayed object on a display screen after an operation of changing the display state based on a direction of the operation, and an image generating section configured to generate a display image including the commonly-displayed object at the determined display position.

Further, according to the present disclosure, there is provided an information processing method including obtaining a commonly-displayed object which is commonly displayed before and after a display state is updated, determining a display position of the commonly-displayed object on a display screen after an operation of changing the display state based on a direction of the operation, and generating a display image including the commonly-displayed object at the determined display position.

Further, according to the present disclosure, there is provided a program for causing a computer to function as an information processing device including an obtaining section configured to obtain a commonly-displayed object which is commonly displayed before and after a display state is updated, a layout determination section configured to determine a display position of the commonly-displayed object on a display screen after an operation of changing the display state based on a direction of the operation, and an image generating section configured to generate a display image including the commonly-displayed object at the determined display position.

Advantageous Effects of Invention

As described above, according to the present disclosure, it is possible to know a position of information being currently displayed without switching the screen.

BRIEF DESCRIPTION OF DRAWINGS

FIG. 8 is an illustration showing a relationship between the size of a display area and the size of a commonly-displayed object of the information processing device according to the embodiment.

FIG. 9 is an illustration of a process for determining a display position of a commonly-displayed object of the information processing device according to the embodiment.

FIG. 21 is an illustration showing an example of a display method with screen switching.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
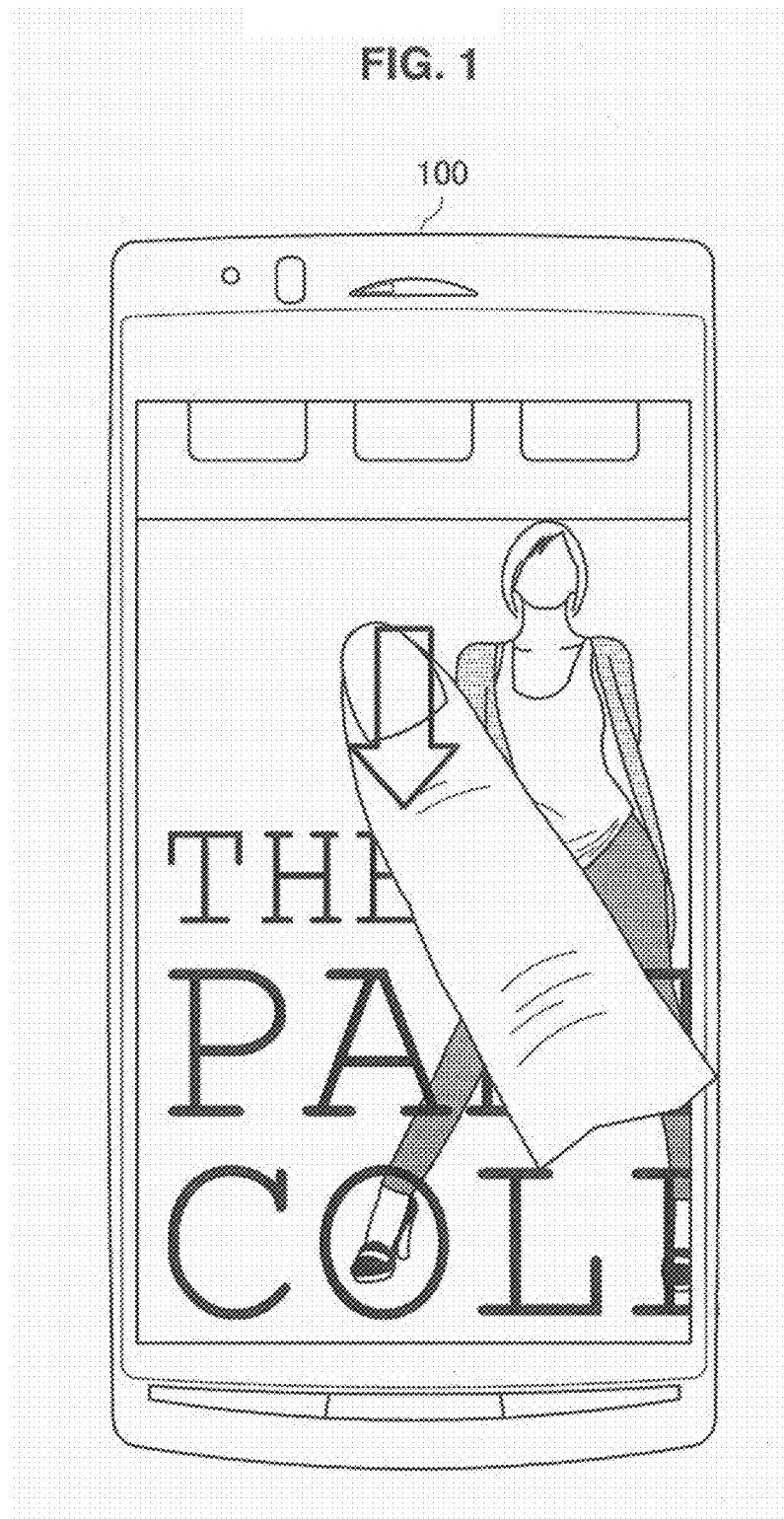
FIG. 1 is an illustration showing an example of an external appearance of an information processing device according to first and second embodiments of the present disclosure.
Figure 2:
FIG. 2 is an illustration showing an example of a content item used by the information processing device according to the first and second embodiments of the present disclosure.
Figure 3:
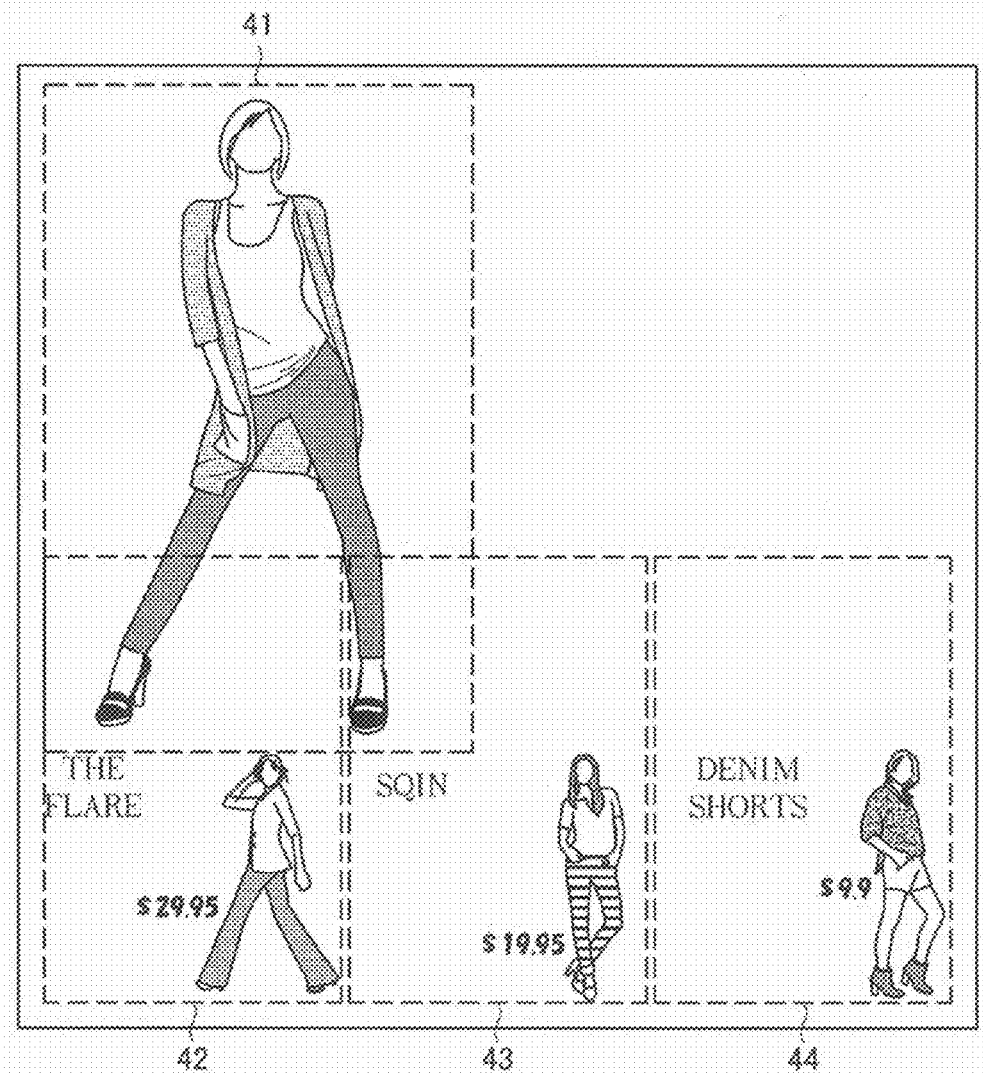
FIG. 3 is an illustration for illustrating an overview of the function of the information processing device according to the first embodiment of the present disclosure.
Figure 4:
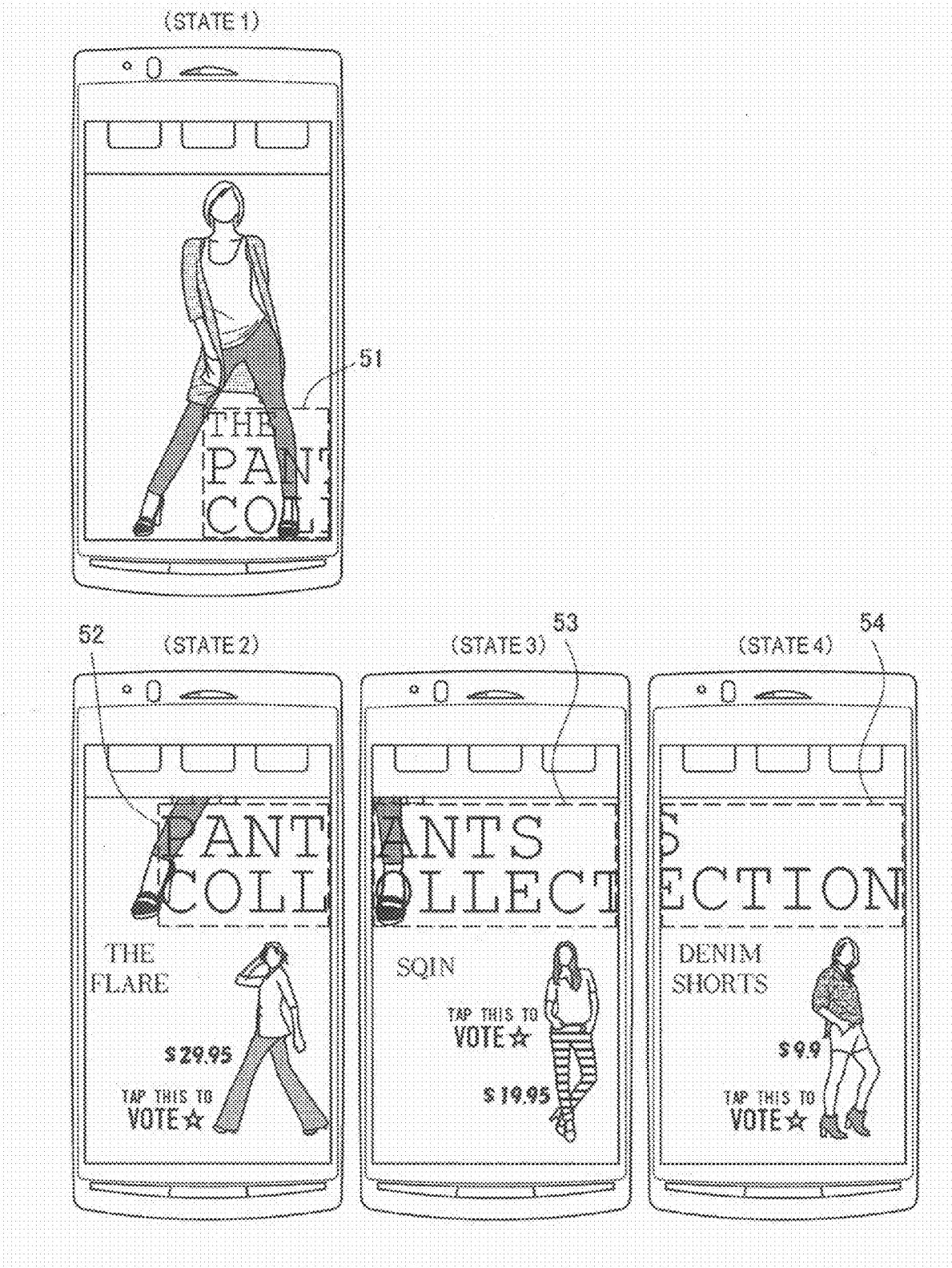
FIG. 4 is an illustration showing an example arrangement of a commonly-displayed object to be displayed by the information processing device according to the embodiment.

Note that descriptions will be made in the following order.
1. First embodiment (an example where a partial area of a content item is displayed)
 1-1. Overview
 1-2. Configuration
 1-3. Operation example
2. Second embodiment (an example where a display screen is generated by arranging objects in a content item)
 2-1. Overview
 2-2. Configuration
 2-3. Operation example
3. Hardware configuration example 1. First Embodiment 1-1. Overview Referring first to FIG. 1 to FIG. 3 and FIG. 21, an overview of the function of an information processing device according to a first embodiment of the present disclosure will be described. FIG. 1 is an illustration showing an example of an external appearance of an information processing device according to first and second embodiments of the present disclosure. FIG. 2 is an illustration showing an example of a content item used by the information processing device according to the first and second embodiments of the present disclosure. FIG. 3 is an illustration for illustrating an overview of the function of the information processing device according to the first embodiment of the present disclosure. FIG. 4 is an illustration showing an example arrangement of a commonly-displayed object to be displayed by the information processing device according to the embodiment. FIG. 21 is an illustration showing an example of a display method with screen switching.

Hereinafter, in the present specification and the drawings, an information processing device 100 will be referred to when describing features that are common between an information processing device 100a according to the first embodiment of the present disclosure and an information processing device 100b according to the second embodiment.

The information processing device 100 is a display control device having a display device or a function of controlling the display of an external display device. The information processing device 100 may be an information processing device such as a PC (Personal Computer), a household video processing device (a DVD recorder, a VCR, or the like), a PDA (Personal Digital Assistant), a household game device, or a household electric appliance, for example. Alternatively, the information processing device 100 may be an information processing device such as a mobile phone, a PHS (Personal Handyphone System), a portable music player device, a portable video processing device, or a portable game device. Hereinafter, it is assumed that the information processing device 100 is a mobile phone having a touch panel on the front surface thereof.

The information processing device 100a has a function of displaying a content item 40 as shown in FIG. 2, for example, on the display screen. Then, the information processing device 100a can display a portion of the content item 40 on the display screen. The information processing device 100a may determine a display area of the content item 40 in response to a user operation. The information processing device 100a may move the display area by an amount determined based on a user operation. Alternatively, the information processing device 100a may set a plurality of display areas in the content item 40 in advance, and select and display one of the display areas based on the direction of a user operation. For example, as shown in FIG. 3, a first display area 41, a second display area 42, a third display area 43 and a fourth display area 44 may be set in the content item 40. It is preferred that these display areas are set at such positions in the content item 40 that the viewability of information is high. With such a configuration, it is possible to reduce the burden on the user for viewing information. A commonly-displayed object 50 to be later described in detail may be selected from among objects included in the content item 40.

Note that in the present disclosure, a commonly-displayed object is used to indicate which part of the entire content item 40 corresponds to which of these display areas. FIG. 4 shows an example arrangement of a commonly-displayed object. For example, in State 1 in which the first display area 41 is displayed, since the first display area 41 is an upper left portion of the content item 40, a commonly-displayed object 51, which is an upper left portion of the commonly-displayed object 50, is included in the display image. A user who sees the commonly-displayed object 51 can recognize that only a part of the object of the commonly-displayed object Si is displayed. It is also possible to recognize that a right portion of the object is missing, and it is therefore possible to grasp that the first display area 41 is a left portion of the content item 40.

In State 2 in which the second display area 42 is displayed, since the second display area 42 is a lower left portion of the content item 40, a commonly-displayed object 52, which is a lower left portion of the commonly-displayed object 50, is included in the display image. A user who sees the commonly-displayed object 52 can recognize that the commonly-displayed object 52 is a portion of the object. Since a right portion of the object is missing, it is possible to recognize that the second display area 42 is a left portion of the content item 40. Moreover, when transitioning from State 1 to State 2, the commonly-displayed object 50 is displayed even during the transition. Therefore, one can intuitively recognize that State 2 is a lower portion of State 1.

In State 3 in which the third display area 43 is displayed, since the third display area 43 is a lower center portion of the content item 40, a commonly-displayed object 53, which is a lower center portion of the commonly-displayed object 50, is included in the display image.

In State 4 in which the fourth display area 44 is displayed, since the fourth display area 44 is a lower right portion of the content item 40, a commonly-displayed object 54, which is a lower right portion of the commonly-displayed object 50 is included in the display image.

Then, the information processing device 100a may determine the layout so that the entire portion of the commonly-displayed object 50 will be displayed when all of the display areas included in the content item 40 are displayed.

For example, one might employ a method of switching between a list display and a detailed display as shown in FIG. 21 for an overview characteristic, for example. However, according to the method of the present disclosure, a user can recognize the position of detailed information with respect to the entirety without switching the display.

A configuration of such an information processing device 100a will next be described in detail.

1-2. Configuration

Figure 5:
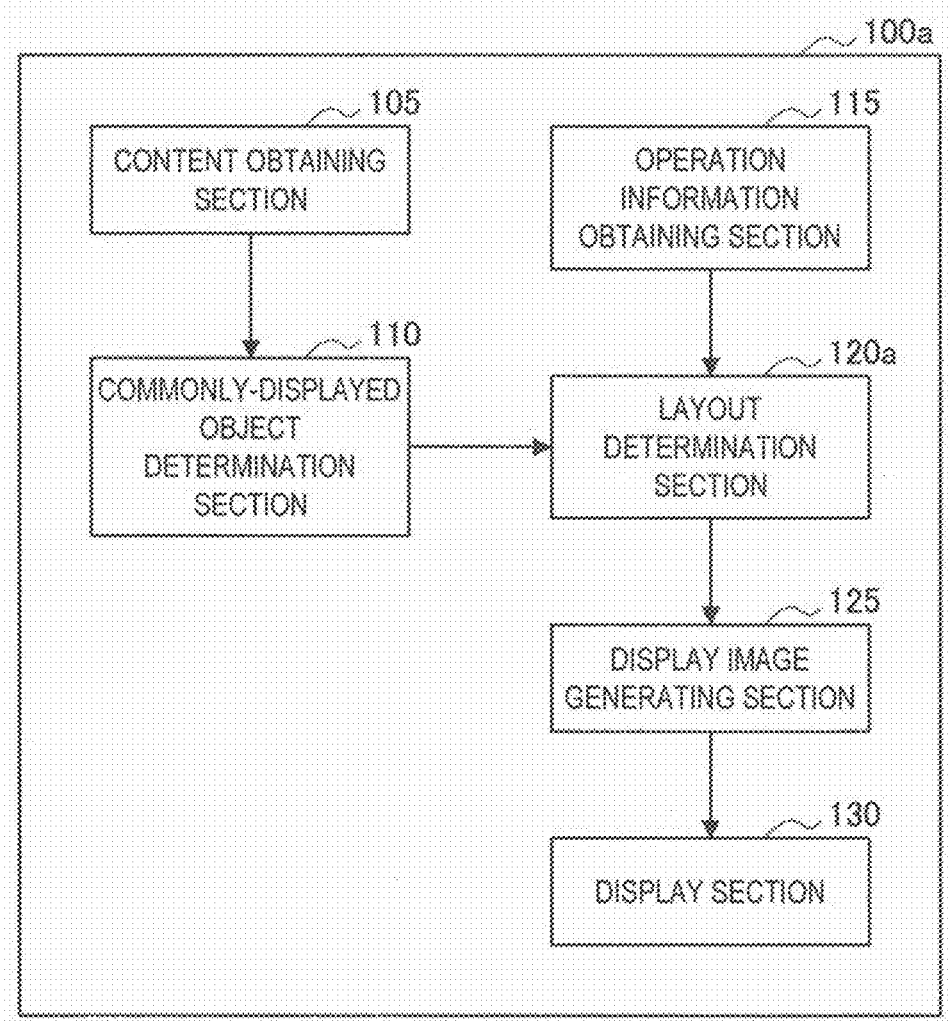
FIG. 5 is a block diagram showing a functional configuration of the information processing device according to the embodiment.
Figure 6:
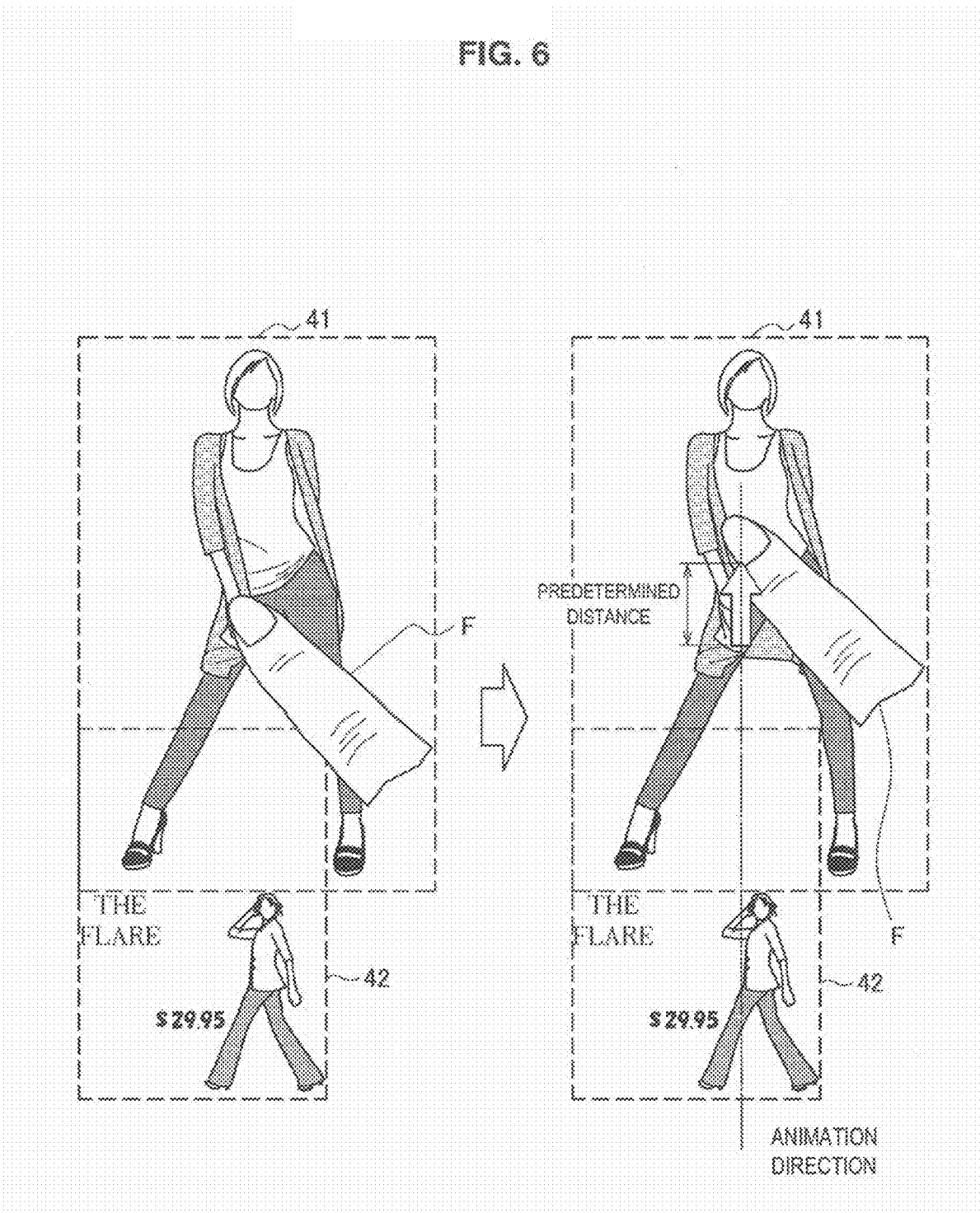
FIG. 6 is an illustration of an example of a display area changing operation and an animation direction determination method of the information processing device according to the embodiment.
Figure 7:
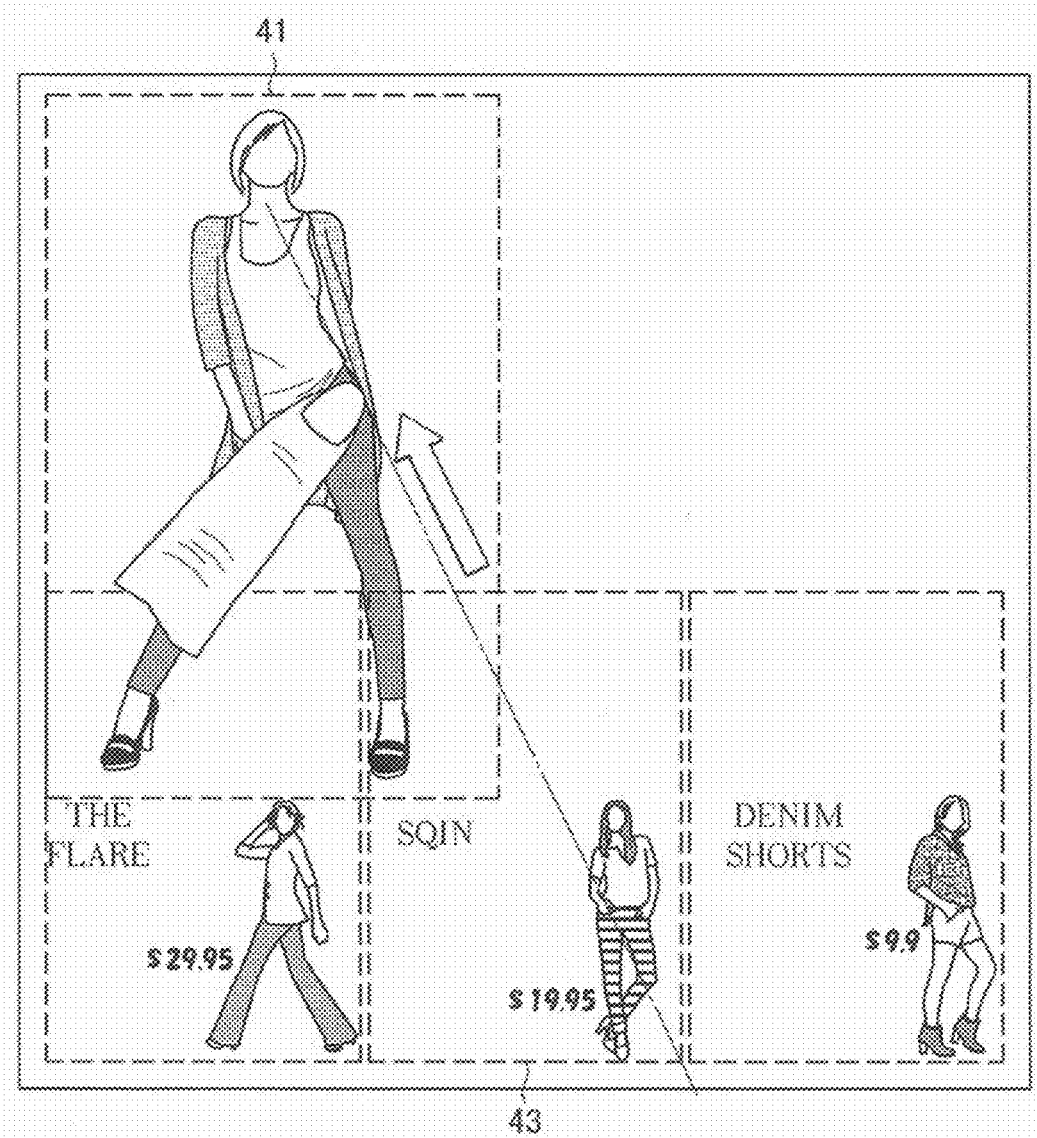
FIG. 7 is an illustration of another example of a display area changing operation and an animation direction determination method of the information processing device according to the embodiment.
Figure 10:
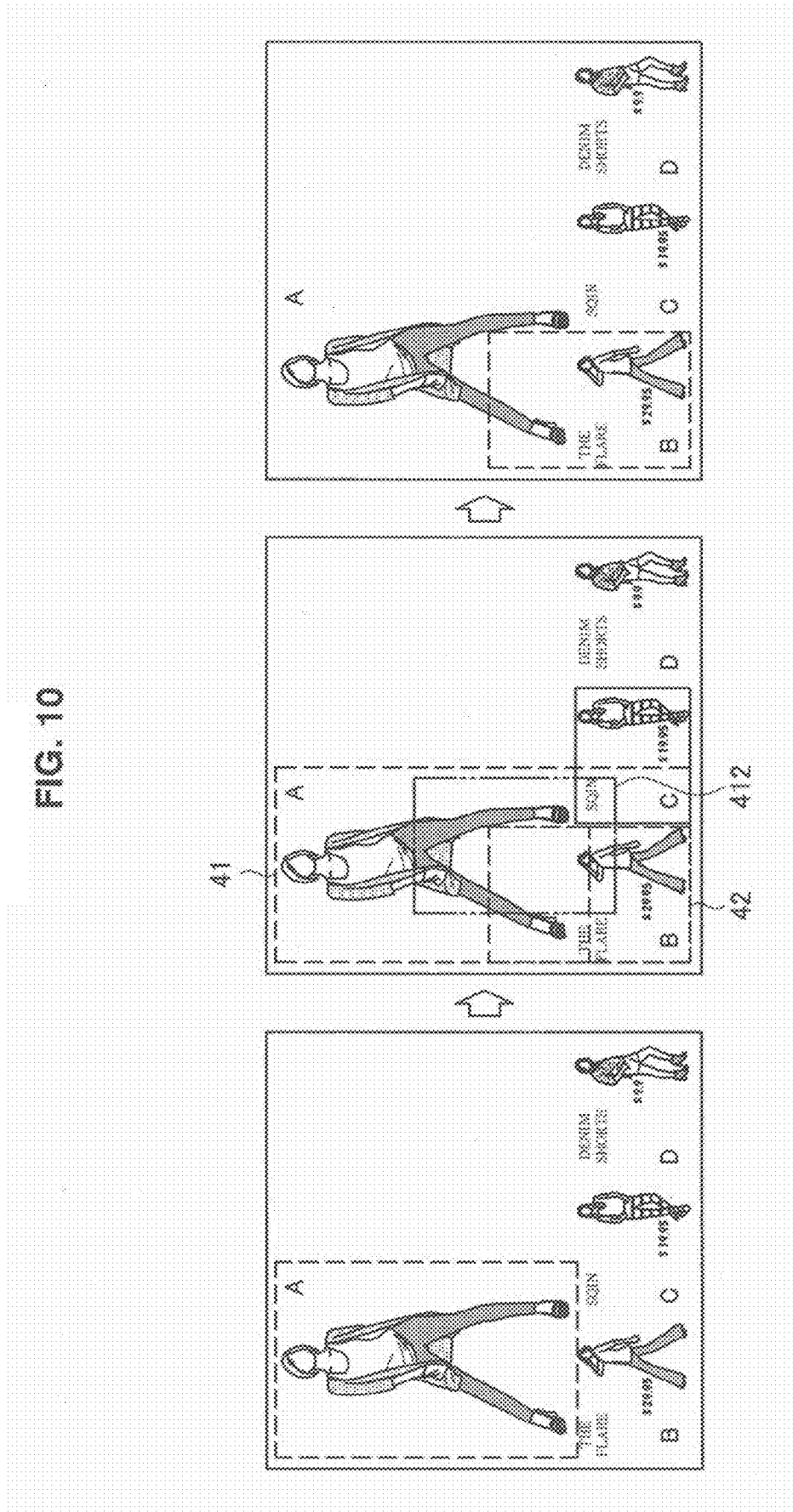
FIG. 10 is an illustration showing an example of an animation representation used when changing the display area of the information processing device according to the embodiment.
Figure 11:
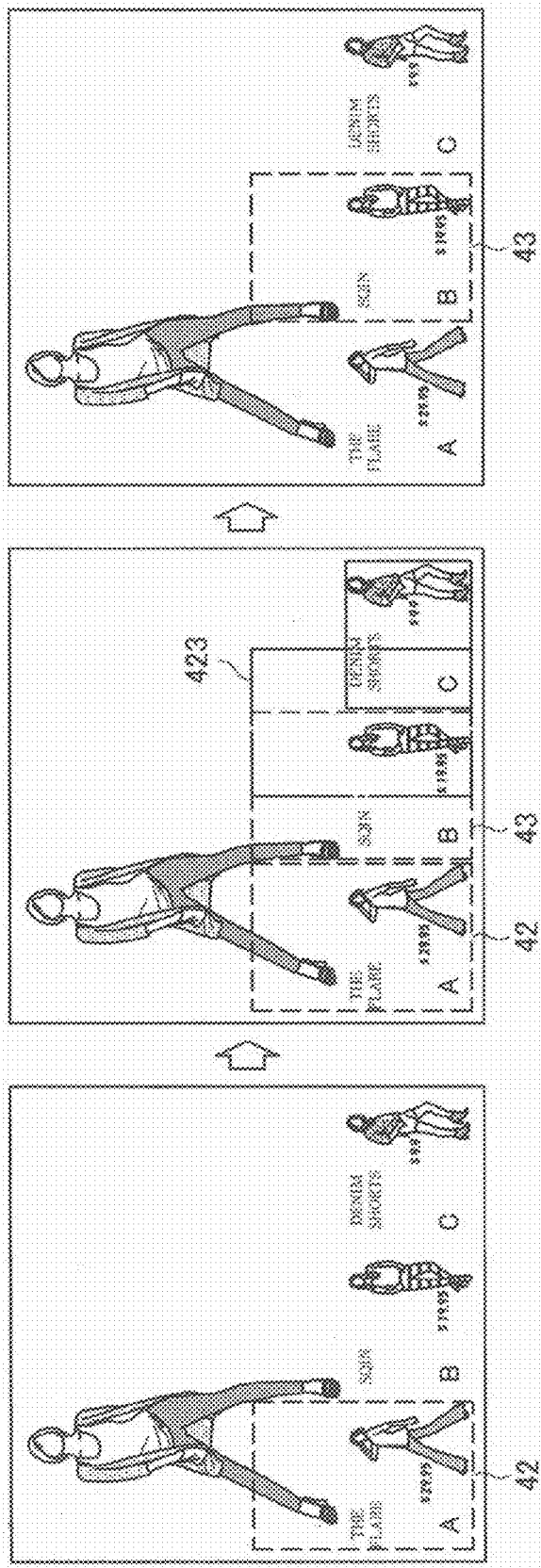
FIG. 11 is an illustration showing another example of an animation representation used when changing the display area of the information processing device according to the embodiment.

Referring next to FIG. 5 to FIG. 11, a functional configuration of the information processing device 100a according to the first embodiment of the present disclosure will be described. FIG. 5 is a block diagram showing a functional configuration of the information processing device according to the embodiment. FIG. 6 is an illustration of an example of a display area changing operation and an animation direction determination method of the information processing device according to the embodiment. FIG. 7 is an illustration of another example of a display area changing operation and an animation direction determination method of the information processing device according to the embodiment. FIG. 8 is an illustration showing a relationship between the size of a display area and the size of a commonly-displayed object of the information processing device according to the embodiment. FIG. 9 is an illustration of a process for determining a display position of a commonly-displayed object of the information processing device according to the embodiment. FIG. 10 is an illustration showing an example of an animation representation used when changing the display area of the information processing device according to the embodiment. FIG. 11 is an illustration showing another example of an animation representation used when changing the display area of the information processing device according to the embodiment.

Referring to FIG. 5, the information processing device 100a of the present embodiment primarily includes a content obtaining section 105, a commonly-displayed object determination section 110, an operation information obtaining section 115, a layout determination section 120a, a display image generating section 125, and a display section 130.

(Content Obtaining Section 105)

The content obtaining section 105 has a function of obtaining content items to be displayed on the display screen. The content obtaining section 105 may obtain content items stored inside the information processing device 100a. Alternatively, the content obtaining section 105 may obtain content items from an external device connected thereto via a network.

(Commonly-Displayed Object Determination Section 110)

The commonly-displayed object determination section 110 has a function of determining the commonly-displayed object 50, which is commonly displayed even when the display area is changed, while a content item is displayed. If the content item includes information of a commonly-displayed object, the commonly-displayed object determination section 110 may determine the commonly-displayed object according to this information by referencing the information. The commonly-displayed object determination section 110 may determine a commonly-displayed object from among objects included in the content item based on feature value information obtained by analyzing objects included in the content item.

(Operation Information Obtaining Section 115)

The operation information obtaining section 115 may include an input section for allowing a user to input information, for example, and an input control circuit for generating an input signal based on the input, etc. For example, an example of the input section may be a touch panel, a mouse, a keyboard, a button, a microphone, a switch, a lever, or the like.

(Layout Determination Section 120a)

The layout determination section 120a has a function of determining a layout of a display image based on information of a commonly-displayed object determined by the commonly-displayed object determination section 110 using a content item obtained by the content obtaining section 105, and operation information obtained by the operation information obtaining section 115. Now, an example of the determination of the display area, the layout of the commonly-displayed object, and the animation representation used when changing the display area will be described.

In the present embodiment, the layout determination section 120a determines the layout by cutting out a partial area of the content item 40, and superimposing the commonly-displayed object on the cut-out display area. For example, a user performs an operation on the display screen using the operator F in a state where the first display area 41 is displayed, as shown in FIG. 6. When the traveling distance becomes greater than or equal to a predetermined distance, the layout determination section 120a can determine the animation direction based on the direction of the traveling path over this predetermined distance. The layout determination section 120a can use, as the display area to be displayed next, the second display area 42 which is present in this animation direction in the content item 40.

Referring next to FIG. 7, an another example of animation direction and display area determination is shown. When the operator F moves as shown by an arrow in FIG. 7, the animation direction is determined based on this traveling path. Then, the layout determination section 120a can use, as the display area to be displayed next, the third display area 43 which is present in this animation direction in the content item 40.

As shown in FIG. 8, the layout determination section 120a may determine the size in which the commonly-displayed object 50 is displayed based on the ratio between the size of the display area and that of the content item 40. For example, as the proportion by which the display area occupies the content item 40 is larger, the size of the commonly-displayed object 50 to be displayed may be larger. For example, the proportion by which the first display area 41 occupies the content item 40 is larger than the proportion by which the second display area 42 occupies the content item 40. Then, the layout determination section 120a may determine the size of a commonly-displayed object 50a to be superimposed on the first display area 41 to be larger than the size of a commonly-displayed object 50b to be superimposed on the second display area 42.

The position at which the commonly-displayed object 50 is superimposed on the image of a display area may be determined based on the positional relationship between the center C of the content item 40 and the center of the display area, for example. For example, referring to FIG. 9, for the first display area 41, the position at which the commonly-displayed object 50 is displayed is determined based on the positional relationship between the center C of the content item 40 and the center C1 of the first display area 41, specifically, the direction of the center C of the content item 40 as seen from the center C1 of the first display area 41 and the distance between the center C1 of the first display area 41 and the center C of the content item 40. With such a method, for the first display area 41, which is an upper left partial area of the content item 40, an upper left partial area of the commonly-displayed object 50 is superimposed on a lower right portion of the first display area 41.

Similarly, for the second display area 42, the position at which the commonly-displayed object 50 is displayed is determined based on the positional relationship between the center C of the content item 40 and the center C2 of the second display area 42. With such a method, for the second display area 42, which is a lower left partial area of the content item 40, a lower left partial area of the commonly-displayed object 50 is superimposed on an upper right portion of the second display area 42.

Next, an example of an animation representation used when changing the display area will be described. For example, as shown in FIG. 10, by displaying a portion of C during the transition from A to B, a user can recognize the presence of C during the transition from A to B. Examples of animation representation for use herein may be enlarging/reducing, overshooting, etc. In this case, the layout determination section 120a operates so that a display area 412, which is displayed during the transition from the first display area 41 to the second display area 42, contains information of C.

Similarly, in FIG. 11, by displaying a portion of C during the transition from A to B, a user can recognize the presence of C during the transition from A to B. In this case, the layout determination section 120a operates so that a display area 123, which is displayed during the transition from the second display area 42 to the third display area 43, contains information of C.

Note that the animation representation may be an animation representation suitable for the attribute of the object to be displayed. For example, it is possible to display a button object having a function of allowing one to vote for an object representing a coordination included in the content item 40. In this case, it is preferred that an animation representation that does not involve a change in the display position, such as fading, is used for the button object so that the positional relationship between the button and the item associated therewith will not be unclear and so that the possibility of an erroneous operation is reduced.

It is also preferred that translation+scaling is used in order to maintain the continuity of an image object, or the like. It is important for a text object to maintain its viewability. Therefore, it is preferred to use translation with a reduced α value or fading. Translation, for example, is not preferred as an animation representation for use with a text object because of its heavy visual burden on the user.

(Display Image Generating Section 125)

The display image generating section 125 has a function of generating a display image in accordance with the layout determined by the layout determination section 120a. The display image generating section 125 is capable of supplying the generated display image to the display section 130.

(Display Section 130)

The display section 130 has a function of providing, to a user, the display image generated by the display image generating section 125. Here, the display section 130 includes a display device, and a display control section for controlling the content to be displayed on the display device. However, the present technique is not limited to such an example. For example, the display section 130 may be a display control section for controlling the display of an external display device. The display device may be, for example, a liquid crystal display (LCD: Liquid Crystal Display) device, an organic EL (OLED: Organic Light Emitting Diode) display device, or the like.

An example of the function of the information processing device 100a according to the present embodiment has been described above. Each component described above may be implemented by using a general-purpose member or circuit, or ma be implemented by hardware specialized in the function of the component. The function of each component may be performed by loading a control program, describing procedures for an arithmetic unit such as a CPU (Central Processing Unit) to implement the function, from a storage medium such as a ROM (Read Only Memory) or a RAM (Random Access Memory) storing the control program, and by interpreting and executing the program. Therefore, the configuration to be used may be changed as necessary depending on the level of technology at the time of carrying out the present embodiment. Note that an example of the hardware configuration of the information processing device 100a will be described later in detail.

Note that a computer program for implementing the functions of the information processing device 100a according to the present embodiment as described above may be produced and installed on a personal computer, or the like. It is also possible to provide a computer-readable recording medium having such a computer program stored therein. The recording medium may be a magnetic disk, an optical disk, a magneto optical disk, a flash memory, or the like, for example. The computer program described above may be distributed via a network, for example, without using a recording medium.

1-3. Operation Example

Figure 12:
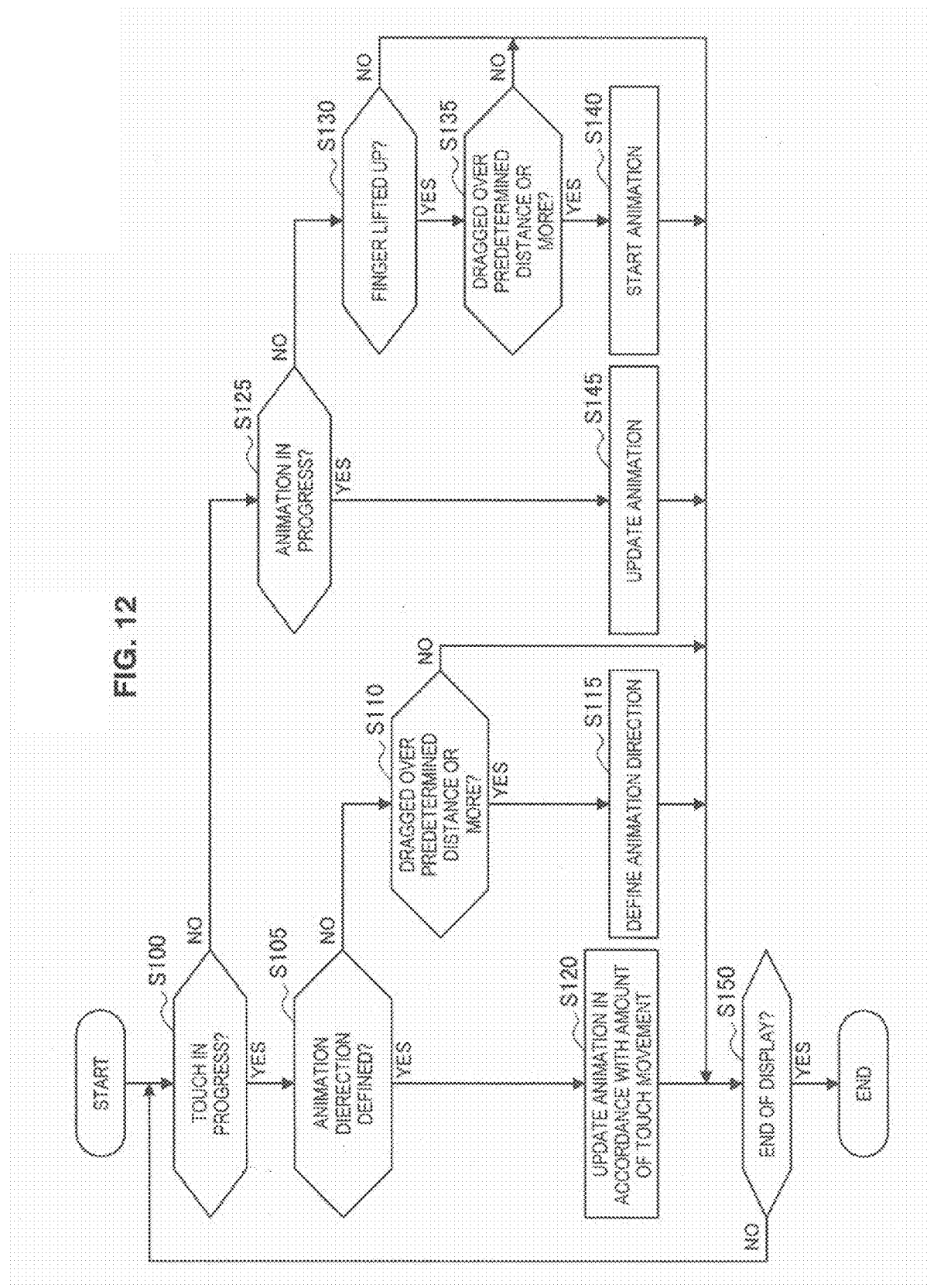
FIG. 12 is a flow chart showing an operation example of the information processing device according to the embodiment.

Referring next to FIG. 12, an operation example of the information processing device 100 according to the first embodiment of the present disclosure will be described.

FIG. 12 is a flow chart showing an operation example of the information processing device according to the embodiment.

Referring to FIG. 12, first, it is determined whether a touch operation is in progress based on operation information 115 (S100). If it is determined that a touch operation is in progress, it is next determined whether an animation direction has already been defined (S105). If it is determined in step S105 that an animation direction has not yet been defined, it is next determined whether a drag operation has been performed over a predetermined distance or more (S110). If a drag operation is performed over a predetermined distance or more, an animation direction is defined based on the path of this drag operation (S115).

On the other hand, if it is determined in step S105 that an animation direction has already been defined, an animation is updated in accordance with the amount of touch movement (S120).

On the other hand, if it is determined in step S100 that a touch operation is not in progress, it is next determined whether an animation is in progress (S125). If it is determined in step S125 that an animation is not in progress, it is next determined whether the finger, which is the operator F, has been lifted up (S130). Then, if it is determined that the finger has been lifted up, it is next determined whether a drag operation has been performed over a predetermined distance or more (S135).

If it is determined in step S135 that a drag operation has been performed over a predetermined distance or more, an animation is then started (S140). On the other hand, if it is determined in step S125 that an animation is in progress, the animation is updated (S145). Then, it is determined whether the display has ended (S150). The process described above is repeated until the display ends.

2. Second Embodiment

2-1. Overview

In the first embodiment, a display image is generated by cutting out a portion of the content item 40 to be displayed. In this case, the position of the display area to be recognized by a user is a position within the content item 40, and the layout of the content item 40 is determined in advance. In contrast, the information processing device 100b to be described in the second embodiment newly generates a screen by selecting an object to be displayed from among objects included in the content item 40. In this case, since the overall layout is not determined in advance, the commonly-displayed object 50 represents the positional relationship with the display area which was displayed immediately before.

2-2. Configuration

Figure 13:
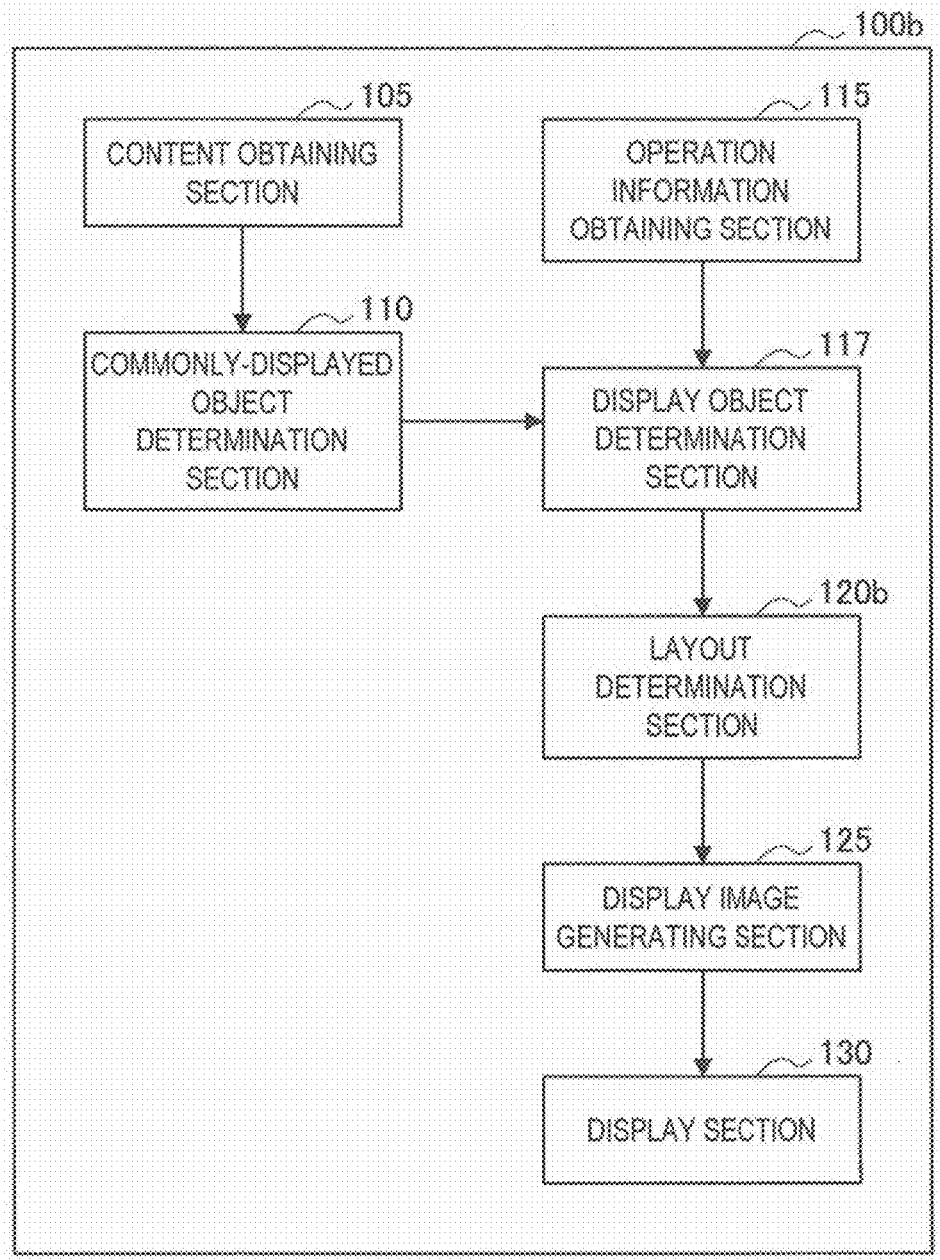
FIG. 13 is a block diagram showing a functional configuration of the information processing device according to the second embodiment of the present disclosure.
Figure 14:
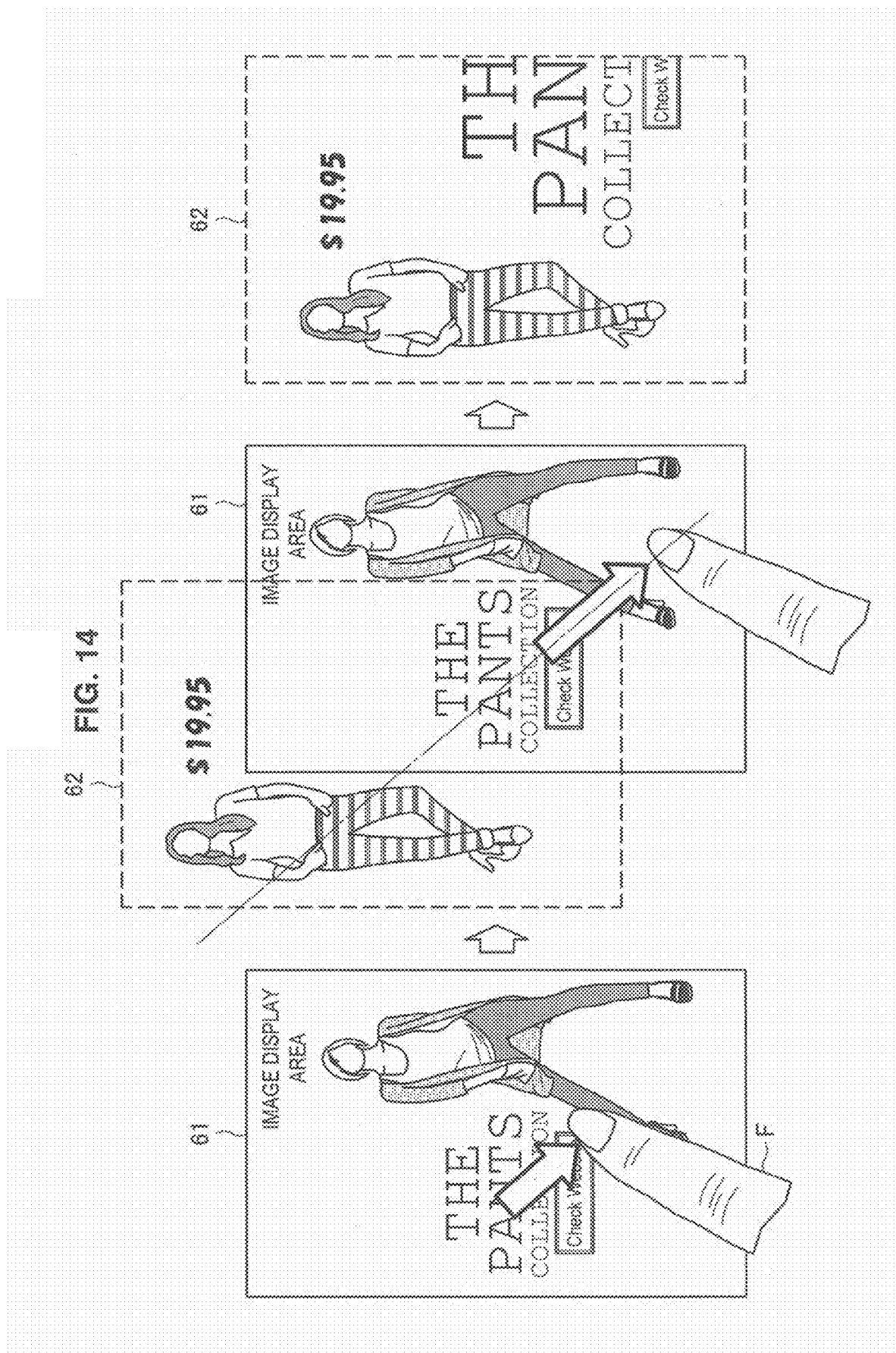
FIG. 14 is an illustration showing an example of a layout generated by the information processing device according to the embodiment.
Figure 15:
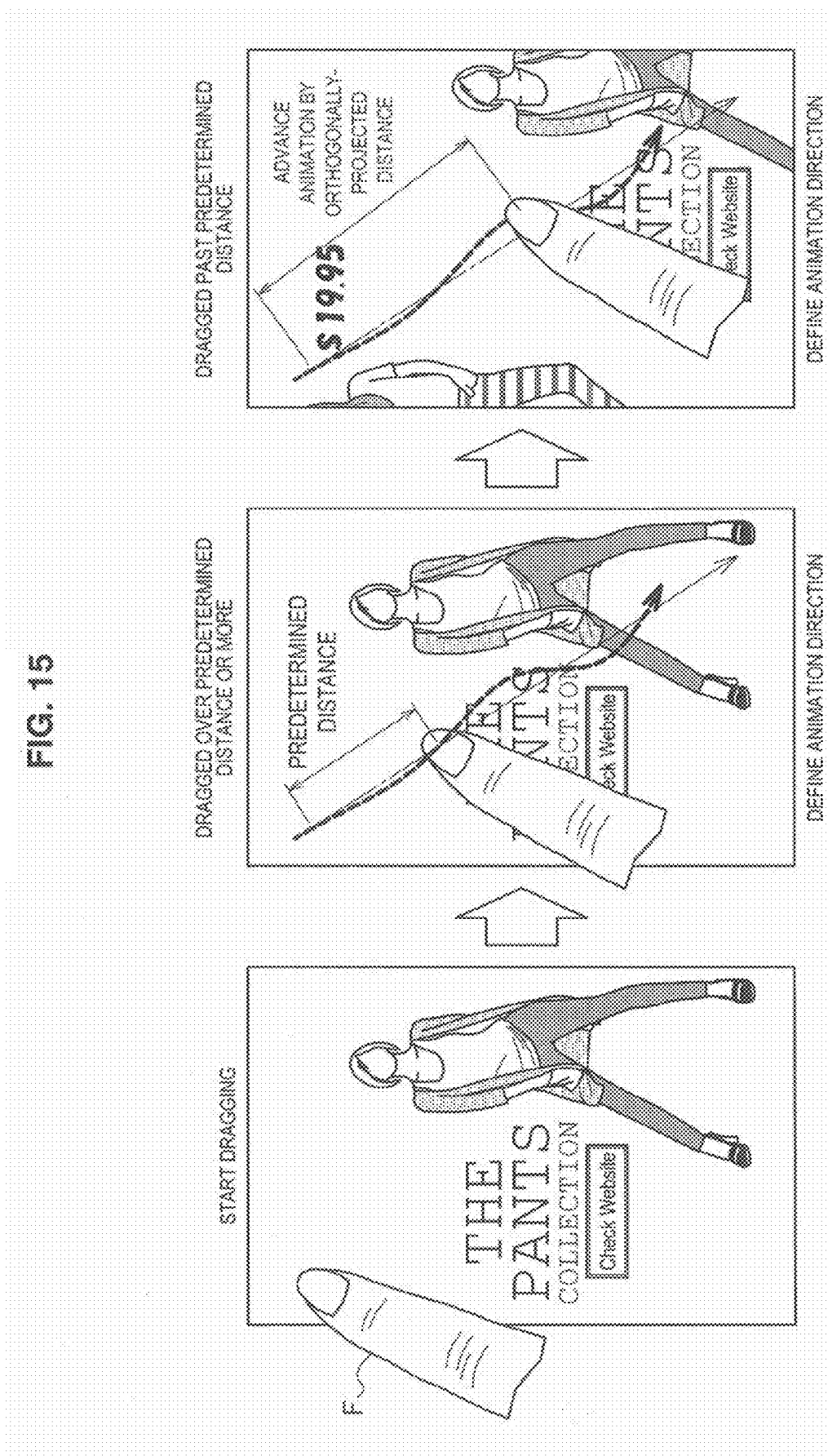
FIG. 15 is an illustration of animation direction determination by the information processing device according to the embodiment.
Figure 16:
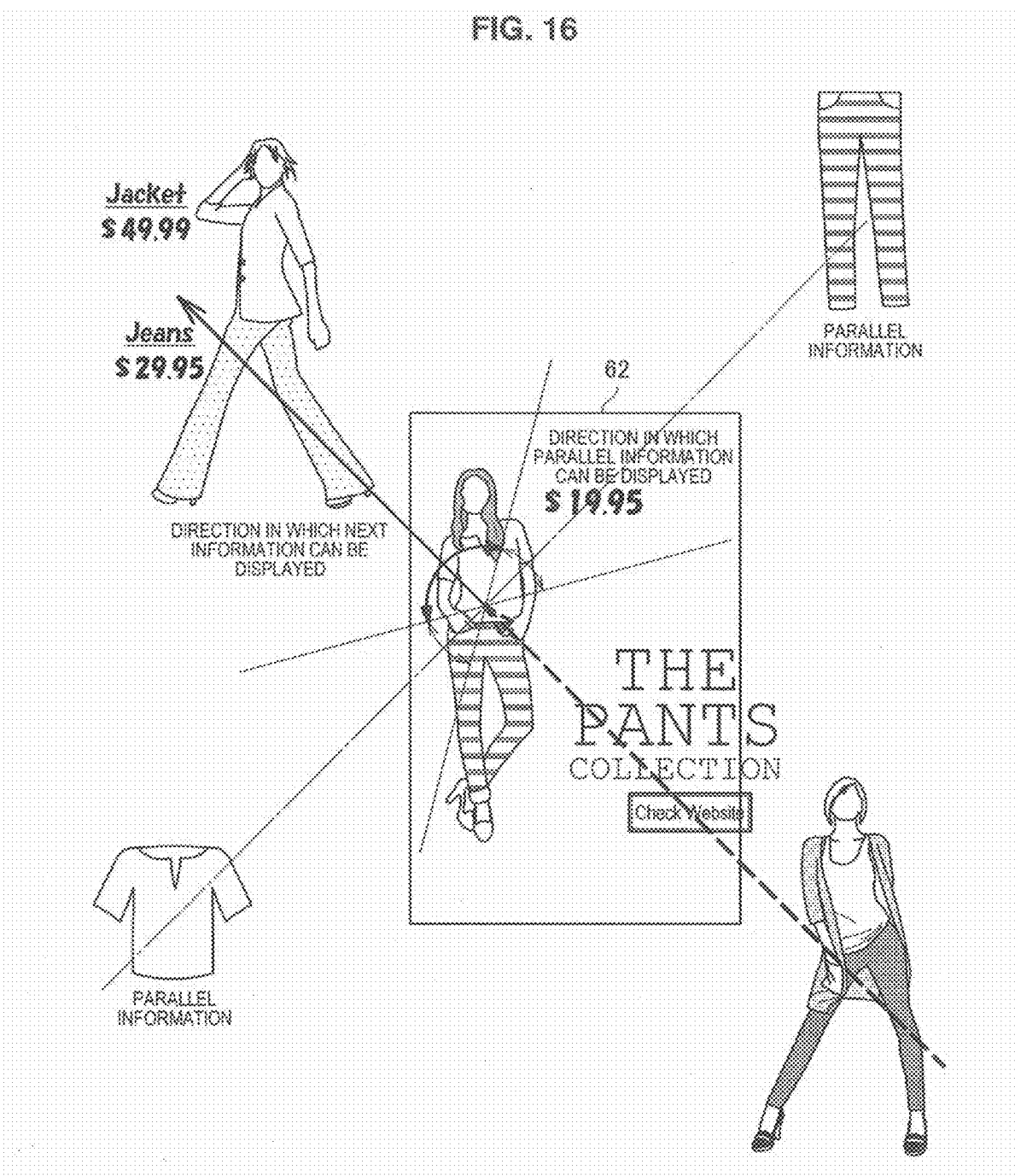
FIG. 16 is an illustration of a limitation on the types of information to be displayed depending on the operation direction of the information processing device according to the embodiment.
Figure 17:
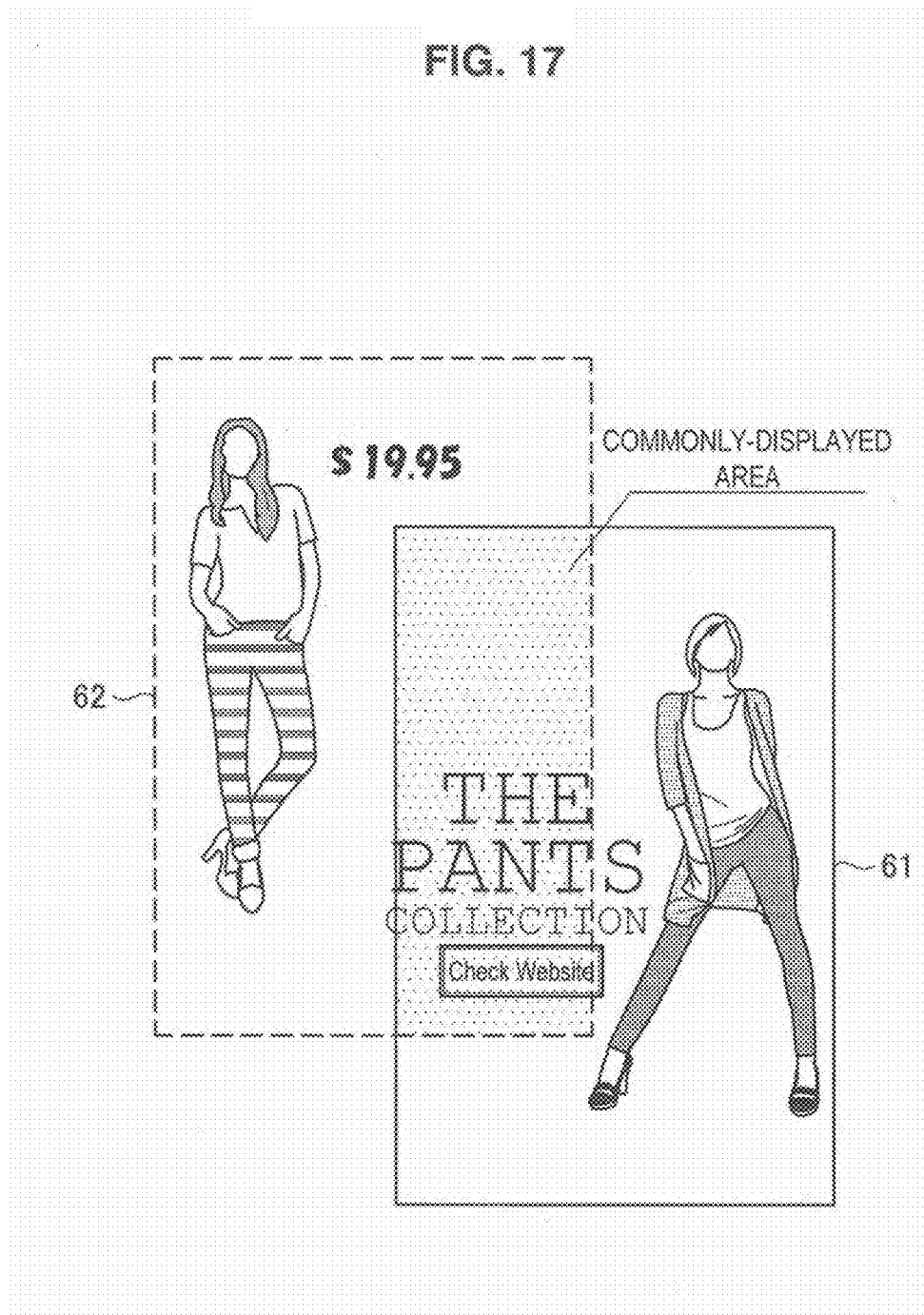
FIG. 17 is an illustration of a commonly-displayed area displayed by the information processing device according to the embodiment.
Figure 18:
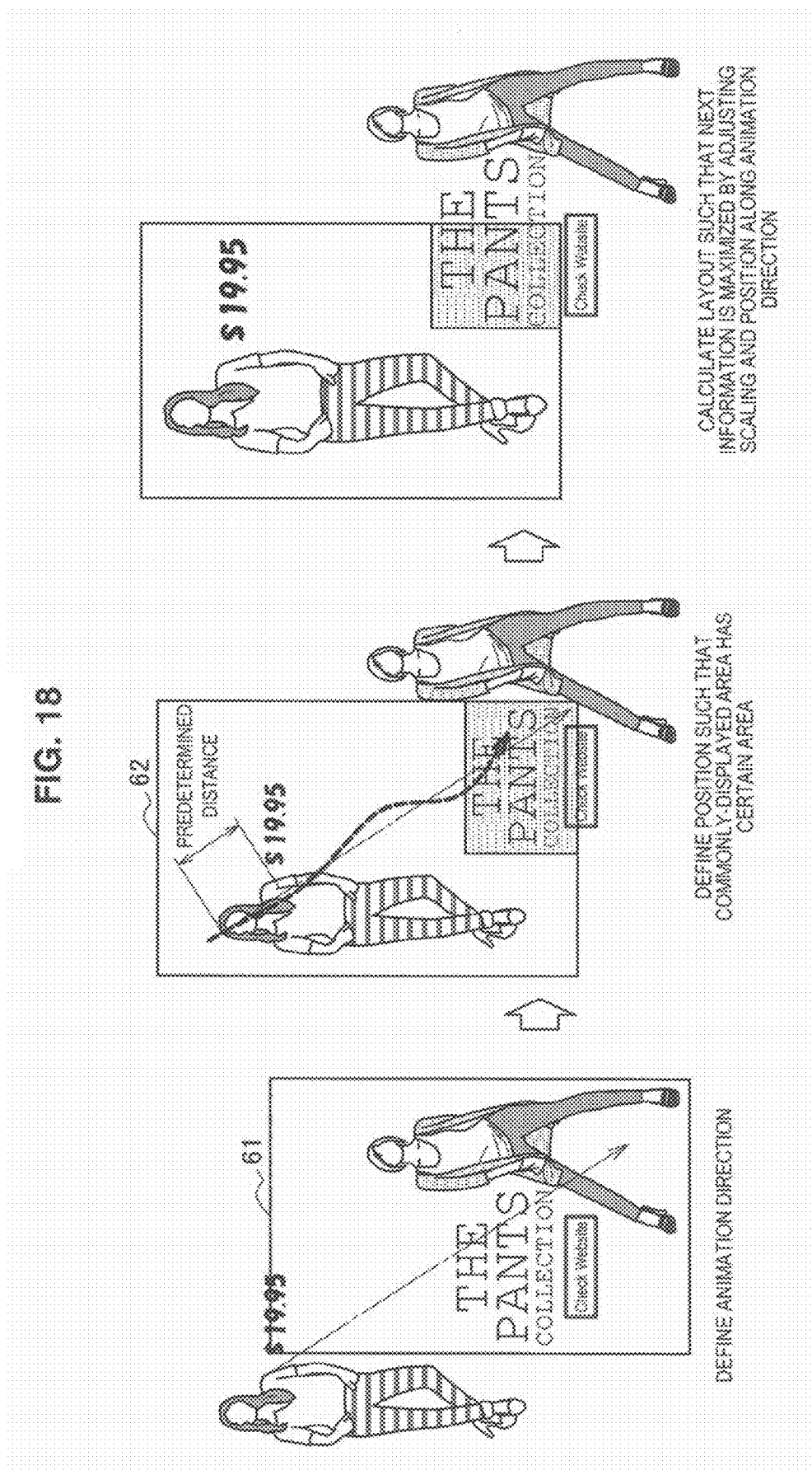
FIG. 18 is an illustration of a layout generation method of the information processing device according to the embodiment.

Referring next to FIG. 13 to FIG. 18, a functional configuration of the information processing device 100b according to the second embodiment of the present disclosure will be described. FIG. 13 is a block diagram showing a functional configuration of the information processing device according to the second embodiment of the present disclosure. FIG. 14 is an illustration showing an example of a layout generated by the information processing device according to the embodiment. FIG. 15 is an illustration of animation direction determination by the information processing device according to the embodiment. FIG. 16 is an illustration of a limitation on the types of information to be displayed depending on the operation direction of the information processing device according to the embodiment. FIG. 17 is an illustration of a commonly-displayed area displayed by the information processing device according to the embodiment. FIG. 18 is an illustration of a layout generation method of the information processing device according to the embodiment.

Referring to FIG. 13, a configuration of the information processing device 100b according to the second embodiment of the present disclosure is shown. The information processing device 100b primarily includes the content obtaining section 105, the commonly-displayed object determination section 110, the operation information obtaining section 115, a display object determination section 117, a layout determination section 120b, the display image generating section 125, and the display section 130. The information processing device 100b further includes the display object determination section 117, in addition to the configuration of the information processing device 100a according to the first embodiment. The following description will primarily focus on the differences from the information processing device 100a.

(Display Object Determination Section 117)

The display object determination section 117 has a function of determining a display object from a content item obtained by the content obtaining section 105. The display object determination section 117 may determine a display object from among those of the objects included in the content item that have not been displayed yet, for example.

(Layout Determination Section 120b)

The layout determination section 120b has a function of determining a layout including the position and the size to display the display object determined by the display object determination section 117, in addition to the position and the size to display the commonly-displayed object 50.

For example, as shown in FIG. 14, if a drag operation is detected in a state where a display area 61 is displayed, the animation is updated in response to the drag operation while the display object to be displayed next in a display area 62 and the position and the size of the commonly-displayed object are determined. Here, an object containing the text "THE PANTS COLLECTION" is used as the commonly-displayed object 50. Note that as described above the positional relationship between the display area 61 and the display area 62 is not determined in advance. If an operation using the operator F is detected, the layout determination section 120b can determine the layout of the display area 62 and generate the display screen.

Note that the layout determination section 120b can determine the layout based on operation information obtained by the operation information obtaining section 115. For example, as shown in FIG. 15, a drag operation is started within a display area. Then, when the drag operation has been performed over a predetermined distance or more, the animation direction is defined based on this path, then, when a drag operation is performed past the predetermined distance, the animation is allowed to proceed by a distance that is obtained by orthogonally projecting the path in the defined animation direction.

A limitation may be imposed on the information to be displayed depending on the operation direction. For example, the direction, which is an extension of the operation direction for displaying the information being currently displayed, may be defined as the direction for displaying the next information (the next object). The direction perpendicular to the operation direction may be defined to be the direction for displaying parallel information for the object being currently displayed. Herein, parallel information may be detailed information of an item included in the object being currently displayed, for example.

FIG. 17 shows a commonly-displayed area that is commonly displayed when transitioning from the display area 61 to the display area 62. This includes the commonly-displayed object 50. With this commonly-displayed area, a user can recognize the positional relationship between the display area 61 and the display area 62. Note that while the positional relationship of a screen to be displayed next is not predetermined in the present embodiment but the screen to be displayed next is generated in response to an operation, a positional relationship once determined is stored. That is, after an operation of transitioning from the display area 61 to the display area 62 is performed to display a screen of the display area 62, if an operation of transitioning in the opposite direction to this operation is detected, the display area 61 is displayed again.

Now, when transitioning from the display area 61 to the display area 62 as shown in FIG. 18, an animation direction is determined based on a drag operation. When a drag operation is detected, a display object to be displayed next is determined. The display position of this display object is determined based on the amount of drag operation, or the like. Then, a position is defined such that the commonly-displayed area has a certain area. Then, a position is defined such that this commonly-displayed area has a certain area. Then, the scale and the position of the object are adjusted so that the information of the display object is maximized in this display area 62. Note that an adjustment may be made by rotating the object. The transmittance of the object may be changed as the animation proceeds.

2-3. Operation Example

Figure 19:
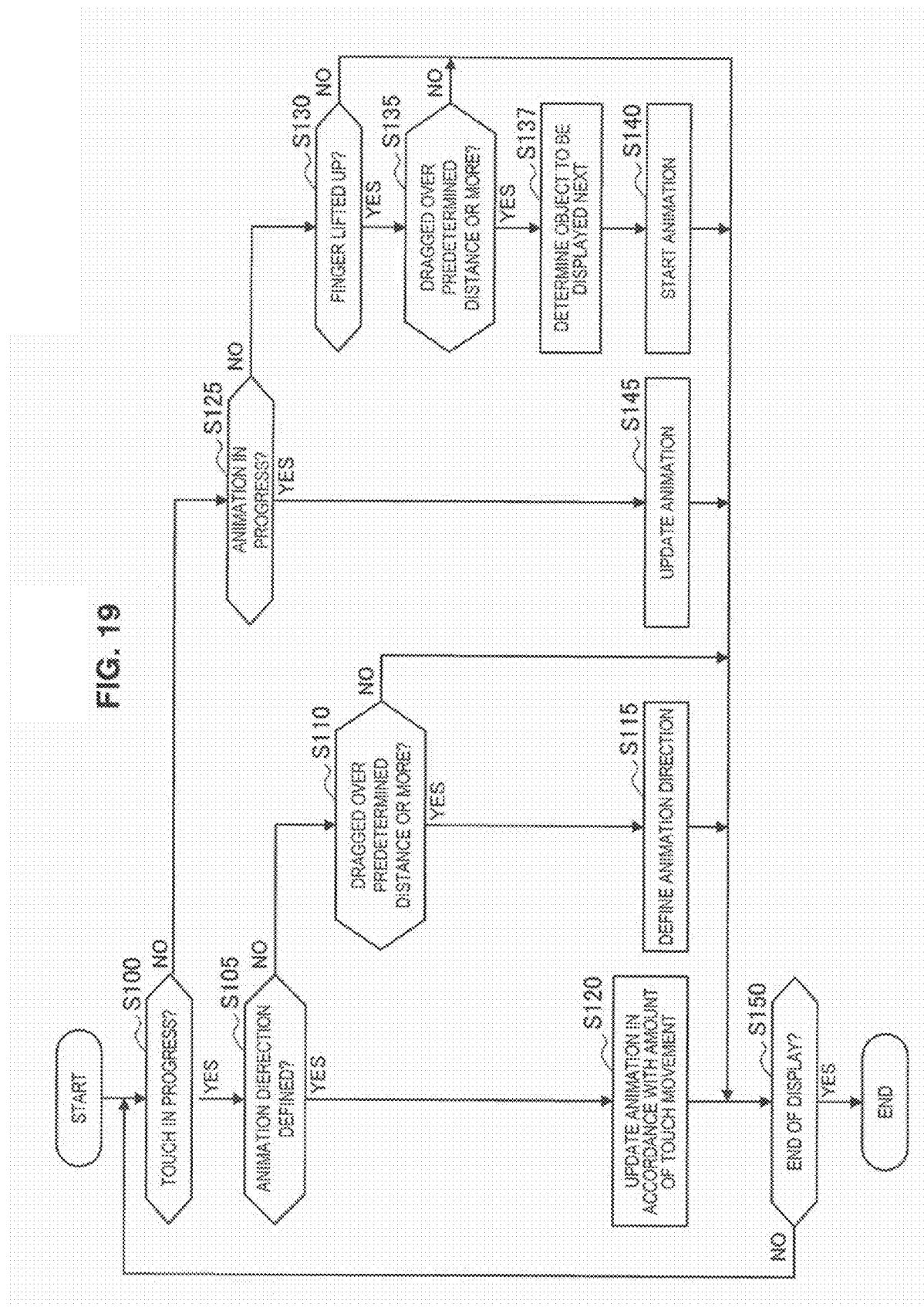
FIG. 19 is a flow chart showing an operation example of the information processing device according to the embodiment.

Referring next to FIG. 19, an operation example of the information processing device 100b according to the second embodiment of the present disclosure will be described. FIG. 19 is a flow chart showing an operation example of the information processing device according to the embodiment.

Referring to FIG. 19, first, it is determined whether a touch operation is in progress based on operation information 115 (S100). If it is determined that a touch operation is in progress, it is next determined whether an animation direction has already been defined (S105). If it is determined in step S105 that an animation direction has not yet been defined, it is next determined whether a drag operation has been performed over a predetermined distance or more (S110). If a drag operation is performed over a predetermined distance or more, an animation direction is defined based on the path of this drag operation (S115).

On the other hand, if it is determined in step S105 that an animation direction has already been defined, an animation is updated in accordance with the amount of touch movement (S120).

On the other hand, if it is determined in step S100 that a touch operation is not in progress, it is next determined whether an animation is in progress (S125). If it is determined in step S125 that an animation is not in progress, it is next determined whether the finger, which is the operator F, has been lifted up (S130). Then, if it is determined that the finger has been lifted up, it is next determined whether a drag operation has been performed opera predetermined distance or more (S135).

If it is determined in step S135 that a drag operation has been performed over a predetermined distance or more, an object to be displayed next is determined (S137). Then, an animation is started next (S140). On the other hand, if it is determined in step S125 that an animation is in progress, the animation is updated (S145). Then, it is determined whether the display has ended (S150). The process described above is repeated until the display ends.

3. Hardware Configuration Example

Figure 20:
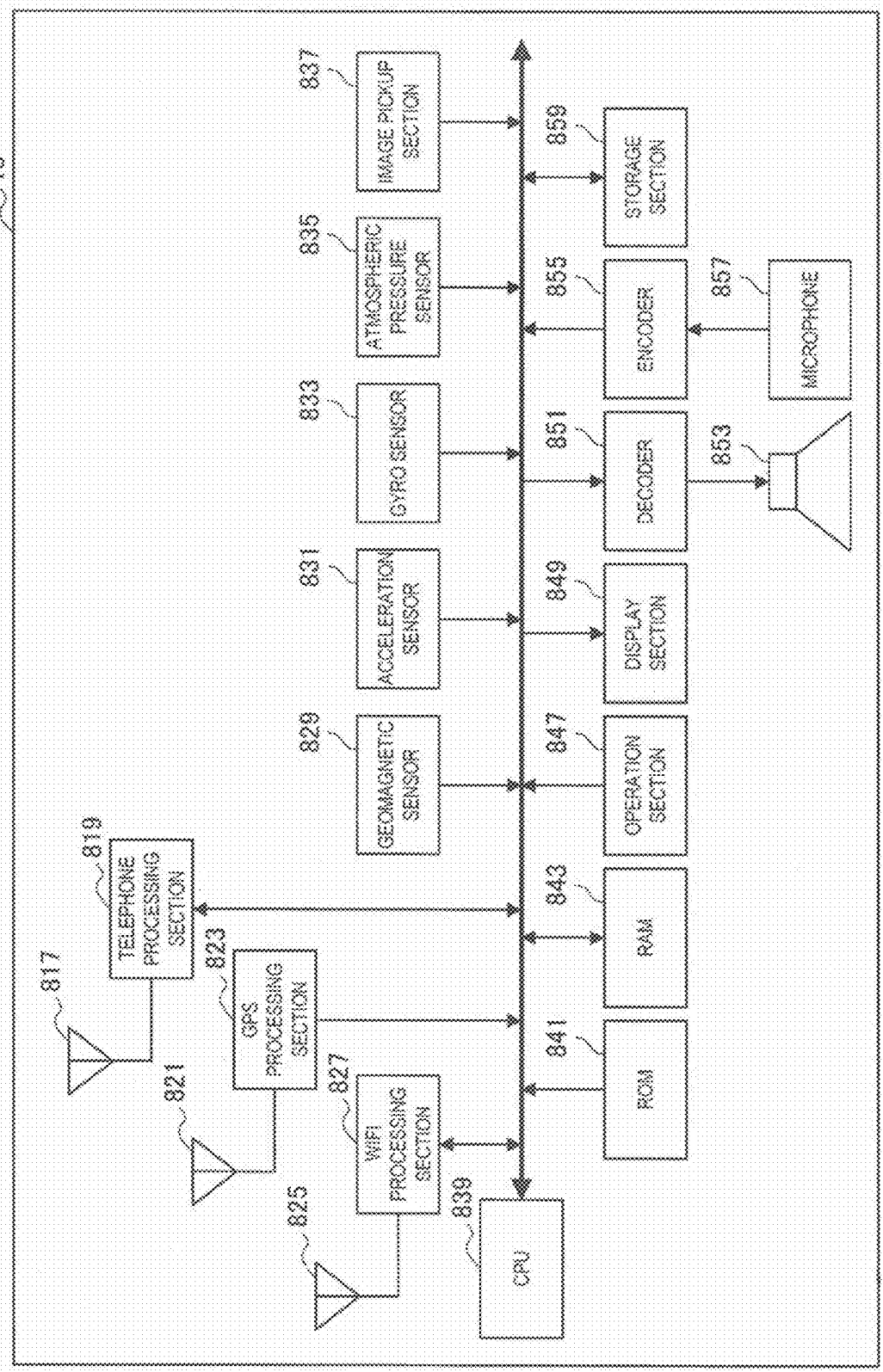
FIG. 20 is a block diagram showing a hardware configuration of the information processing device according to the first and second embodiments of the present disclosure.

The function of the information processing device 100 according to the first and second embodiments of the present disclosure has been described above. Now, a hardware configuration example of the information processing device 100 for implementing these functions will be described with reference to FIG. 20. FIG. 20 is a block diagram showing a hardware configuration of the information processing device according to the first and second embodiments of the present disclosure.

Now, an example of a configuration of the information processing device 100 will be described. Referring to FIG. 20, the information processing device 100 includes a telephone network antenna 817, a telephone processing section 819, a GPS antenna 821, a GPS processing section 823, a Wifi antenna 825, a Wifi processing section 827, a geomagnetic sensor 829, an acceleration sensor 831, a gyro sensor 833, an atmospheric pressure sensor 835, an image pickup section 837, a CPU (Central Processing Unit) 839, a ROM (Read Only Memory) 841, a RAM (Random Access Memory) 843, an operation section 847, a display section 849, a decoder 851, a speaker 853, an encoder 855, a microphone 857, and a storage section 859, for example. Note that the hardware configuration illustrated herein is an example, and some of the components may be omitted. It is understood that components other than those illustrated herein may be further included.

(Telephone Network Antenna 817)

The telephone network antenna 817 is an example of an antenna having a function of wirelessly connecting to a mobile telephone network for telephone calls and communications. The telephone network antenna 817 is capable of supplying call signals received via the mobile telephone network to the telephone processing section 819.

(Telephone Processing Section 819)

The telephone processing section 819 has a function of performing various signal processes on signals transmitted/received by the telephone network antenna 817. For example, the telephone processing section 819 is capable of performing various signal processes on the audio signal received via the microphone 857 and encoded by the encoder 855, and supplying it to the telephone network antenna 817. The telephone processing section 819 is capable of performing various signal processes on the audio signal supplied from the telephone network antenna 819, and supplying it to the decoder 851.

(GPS Antenna 821)

The GPS antenna 821 is an example of an antenna for receiving signals from positioning satellites. The GPS antenna 821 is capable of receiving GPS signals from a plurality of GPS satellites, and inputting the received GPS signals to the GPS processing section 823.

(GPS Processing Section 823)

The GPS processing section 823 is an example of a calculation section for calculating position information based on signals received from positioning satellites. The GPS processing section 823 calculates the current position information based on a plurality of GPS signals input from the GPS antenna 821, and outputs the calculated position information. Specifically, the GPS processing section 823 calculates the position of each GPS satellite from the orbit data of the GPS satellite, and calculates the distance from each GPS satellite to the information processing device 100 based on the time difference between the transmission time and the reception time of the GPS signal. Then, it is possible to calculate the current three-dimensional position based on the position of each GPS satellite and the distance from the GPS satellite to the information processing device 100 calculated. Note that the orbit data of the GPS satellite used herein may be included in the GPS signal, for example. Alternatively, the orbit data of the UPS satellite may be obtained from an external server via the communication antenna 825.

(Wifi Antenna 825)

The Wifi antenna 825 is an antenna having a function of transmitting/receiving communication signals with a wireless LAN (Local Area Network) communication network in compliance with the Wifi specifications, for example. The Wifi antenna 825 is capable of supplying the received signal to the communication processing section 827.

(Wifi Processing Section 827)

The Wifi processing section 827 has a function of performing various signal processes on signals supplied from the Wifi antenna 825. The Wifi processing section 827 is capable of supplying, to the CPU 839, a digital signal generated from the supplied analog signal.

(Geomagnetic Sensor 829)

The geomagnetic sensor 829 is a sensor for detecting the geomagnetism as a voltage value. The geomagnetic sensor 829 may be a 3-axis geomagnetic sensor for detecting the geomagnetism in each of the X-axis direction, the Y-axis direction and the Z-axis direction. The geomagnetic sensor 829 is capable of supplying the detected geomagnetism data to the CPU 839.

(Acceleration Sensor 831)

The acceleration sensor 831 is a sensor for detecting acceleration as a voltage value. The acceleration sensor 831 may be a 3-axis acceleration sensor for detecting the acceleration along the X-axis direction, the acceleration along the Y-axis direction, and the acceleration along the Z-axis direction. The acceleration sensor 831 is capable of supplying the detected acceleration data to the CPU 839.

(Gyro Sensor 833)

The gyro sensor 833 is a type of a measuring instrument for detecting the angle or the angular velocity of an object. The gyro sensor 833 may be a 3-axis gyro sensor for detecting, as a voltage value, the velocity (angular velocity) at which the rotational angle changes about the X axis, the Y axis and the Z axis. The gyro sensor 833 is capable of supplying the detected angular velocity data to the CPU 839.

(Atmospheric Pressure Sensor 835)

The atmospheric pressure sensor 835 is a sensor for detecting the ambient atmospheric pressure as a voltage value. The atmospheric pressure sensor 835 is capable of detecting the atmospheric pressure at a predetermined sampling frequency, and supplying the detected atmospheric pressure data to the CPU 839.

(Image Pickup Section 837)

The image pickup section 837 has a function of recording a still image or a moving picture through a lens under the control of the CPU 839. The image pickup section 837 may store the recorded image in the storage section 859.

(CPU 839)

The CPU 839 functions as an arithmetic processing device and a control device, and controls the overall operation within the information processing device 100 by various programs. The CPU 839 may be a microprocessor. The CPU 839 is capable of implementing various functions by various programs.

(ROM 841, RAM 843)

The ROM 841 is capable of storing programs, operation parameters, etc., used by the CPU 839. The RAM 843 is capable of temporarily storing a program to be used while being executed by the CPU 839, and parameters, or the like, which appropriately vary during the execution.

(Operation Section 847)

The operation section 847 has a function of generating an input signal for performing a desired operation. The operation section 847 may include an input section for inputting information, such as a touch sensor, a mouse, a keyboard, a button, a microphone, a switch and a lever, for example, and an input control circuit for generating an input signal based on the input and outputting it to the CPU 839, etc.

(Display Section 849)

The display section 849 is an example of an output device, and may be a display device such as a liquid crystal display (LCD: Liquid Crystal Display) device, an organic EL (OLED: Organic Light Emitting Diode) display device, or the like. The display section 849 is capable of providing information by displaying a screen.

(Decoder 851, Speaker 853)

The decoder 851 has a function of performing a decoding, an analog conversion, etc., of the input data under the control of the CPU 839. The decoder 851 is capable of for example, performing a decoding, an analog conversion, etc., of the audio data which has been input via the telephone network antenna 817 and the telephone processing section 819 to output the audio signal to the speaker 853. The decoder 851 is also capable of, for example, performing a decoding, an analog conversion, etc., of the audio data which has been input via the Wifi antenna 825 and the Wifi processing section 827 to output the audio signal to the speaker 853. The speaker 853 is capable of outputting sound based on the audio signal supplied from the decoder 851.

(Encoder 855, Microphone 857)

The encoder 855 has a function of performing a digital conversion, an encoding, etc., of the input data under the control of the CPU 839. The encoder 855 is capable of performing a digital conversion, an encoding, etc., of the audio signal which is input from the microphone 857 to output audio data. The microphone 857 is capable of collecting sound to output the sound as an audio signal.

(Storage Section 859)

The storage section 859 is a device for data storage, and may include a storage medium, a recording device for recording data on a storage medium, a reading device for reading out data from a storage medium, a deleting device for deleting data recorded on a storage medium, etc. The storage medium may be, for example, a nonvolatile memory such as a flash memory, an MRAM (Magnetoresistive Random Access Memory), an FeRAM (Ferroelectric Random Access Memory), a PRAM (Phase change Random Access Memory), and an EEPROM (Electronically Erasable and Programmable Read Only Memory), a magnetic recording medium such as an HDD (Hard Disk Drive), or the like.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, while the transition of the display screen has been described by way of example in the second embodiment above, it is understood that the scope of application of the present technique is not limited to the examples illustrated herein. For example, the display screen may transition through a larger number of steps. Also in such a case, the commonly-displayed object 50 is displayed at a position that at least indicates the positional relationship with the display screen which was displayed immediately before.

While it is assumed in the above embodiment that processes such as generating a display image are performed on the information processing device 100, which is the client unit, the technical scope of the present disclosure is not limited to such an example. Some of the functions of the information processing device 100 may be implemented on a server connected to the client unit via a network. Such a server can perform processes such as analyzing a content item, generating a layout, or generating a display image, for example, in response to an instruction transmitted from the client unit, and transmit a display image or a display control signal to the client unit. Such embodiments are also included within the technical scope of the present disclosure.

Note that steps listed in flow charts in the present specification not only include those processes that are performed chronologically in the order they are listed, but also include those processes that may not be performed chronologically but are performed in parallel or individually. It is understood that even steps that are processed chronologically can be in some cases performed in a different order as necessary.

Additionally, the present technology may also be configured as below.

(1)

An information processing device including:

an obtaining section configured to obtain a commonly-displayed object which is commonly displayed before and after a display state is updated;

a layout determination section configured to determine a display position of the commonly-displayed object on a display screen after an operation of changing the display state based on a direction of the operation; and an image generating section configured to generate a display image including the commonly-displayed object at the determined display position.

(2)

The information processing device according to (1), wherein the image generating section generates the display image including a portion of the commonly-displayed object.

(3)

The information processing device according to (2), wherein the portion of the commonly-displayed object included in the display image is determined based on the direction of the operation.

(4)

The information processing device according to any one of (1) to (3), wherein the image generating section generates the display image using a selected content item, and the layout determination section determines a size of the commonly-displayed object based on a proportion by which a portion of the content item included in the display screen after the operation occupies the content item.

(5)

The information processing device according to any one of (1) to (4), further including a commonly-displayed object determination section configured to determine the commonly-displayed object from among objects included in a selected content item.

(6)

The information processing device according to (5), wherein the commonly-displayed object determination section determines the commonly-displayed object from among objects including text.

(7)

The information processing device according to any one of (1) to (6), wherein the image generating section generates the display image by cutting out a portion of a selected content item and superimposing the commonly-displayed object on the portion.

(8)

The information processing device according to (7), wherein the layout determination section determines a size of the commonly-displayed object to be superimposed based on a proportion by which the portion of the content item included in the display screen after the operation occupies the content item.

(9)

The information processing device according to any one of (1) to (6), wherein the layout determination section determines a layout by re-configuring an arrangement of objects included in a selected content item, thereby dynamically generating a layout after the operation.

(10)

The information processing device according to (9), wherein the layout determination section limits contents of information to be displayed in a next operation direction based on a direction of the operation.

(11)

An information processing method including:

obtaining a commonly-displayed object which is commonly displayed before and after a display state is updated;

determining a display position of the commonly-displayed object on a display screen after an operation of changing the display state based on a direction of the operation; and generating a display image including the commonly-displayed object at the determined display position.

(12)

A program for causing a computer to function as an information processing device including:

an obtaining section configured to obtain a commonly-displayed object which is commonly displayed before and after a display state is updated;

a layout determination section configured to determine a display position of the commonly-displayed object on a display screen after an operation of changing the display state based on a direction of the operation; and an image generating section configured to generate a display image including the commonly-displayed object at the determined display position.

REFERENCE SIGNS LIST

100 information processing device
105 content obtaining section
110 commonly-displayed object determination section
115 operation information obtaining section
117 display object determination section
120 layout determination section
125 display image generating section
130 display section

The invention claimed is:

1. An information processing device comprising:
a central processing unit (CPU) associated with a storage medium, wherein the CPU is configured to
determine a commonly-displayed object, from among a plurality of objects included in a selected content item, and wherein the common-displayed object is commonly displayed before and after a display state of the selected content item is changed;
determine a first display position of the commonly-displayed object on a display screen before the display state of the selected content item is changed, and a second display position of the commonly-displayed object on the display screen after an operation of changing the display state of the selected content item based on a direction of the operation, wherein the first display position is different from the second display position; and
generate a display image after the operation of changing the display state of the selected content item including the commonly-displayed object at the determined second display position,
wherein each object of the plurality of objects included in the selected content item is displayed in a respective display area of a plurality of display areas on the display screen and an entire portion of the commonly-displayed object is displayed when all of the display areas included in the content item are displayed, and when the display state of the content item is changed to display a selected display area from among the plurality of display areas, a corresponding portion of the commonly-displayed object is displayed on the display screen at the determined second display position.

2. The information processing device according to claim 1, wherein the CPU is configured to generate the display image including a portion of the commonly-displayed object.

3. The information processing device according to claim 2, wherein the portion of the commonly-displayed object included in the display image is determined based on the direction of the operation.

4. The information processing device according to claim 1, wherein the CPU is further configured to
generate the display image using the selected content item, and
determine a size of the commonly-displayed object based on a proportion of a portion of the content item included in the display screen after the operation with respect to the selected content item.

5. The information processing device according to claim 1, wherein the CPU is further configured to determine the commonly displayed object from among objects including text.

6. The information processing device according to claim 1, wherein the CPU is further configured to generate the display image by cutting out a portion of the selected content item and superimposing the commonly-displayed object on the portion.

7. The information processing device according to claim 6, wherein the CPU is further configured to determine a size of the commonly-displayed object to be superimposed based on a proportion of the portion of the content item included in the display screen after the operation with respect to the content item.

8. The information processing device according to claim 1, wherein the CPU is further configured to determine a layout by re-configuring an arrangement of objects included in the selected content item, thereby dynamically generating the re-configured layout after the operation.

9. The information processing device according to claim 8, wherein the CPU is further configured to provide contents of information to be displayed in a next operation direction based on a direction of the operation.

10. The information processing device according to claim 1, wherein the determined second display position of the corresponding portion of the commonly-displayed object is based on a positional relationship between a center point of the plurality of objects and a center point of the selected display area.

11. An information processing method comprising:
determining a commonly-displayed object, from among a plurality of objects included in a selected content item, and wherein the commonly-displayed object is commonly displayed before and after a display state of the selected content item is changed;
determining a first display position of the commonly-displayed object on a display screen before the display state of the selected content item is changed, and a second display position of the commonly-displayed object on the display screen after an operation of changing the display state of the selected content item based on a direction of the operation, wherein the first display position is different from the second display position; and
generating a display image after the operation of changing the display state of the selected content item including the commonly-displayed object at the determined second display position,
wherein each object of the plurality of objects included in the selected content item is displayed in a respective display area of a plurality of display areas on the display screen and an entire portion of the commonly-displayed object is displayed when all of the display areas included in the content item are displayed, and when the display state of the content item is changed to display a selected display area from among the plurality of display areas, a corresponding portion of the commonly-displayed object is displayed on the display screen at the determined second display position, and
wherein the obtaining of the commonly-displayed object, the determining of the display position, and the generating of the display image are performed utilizing at least one processor.

12. The information processing device according to claim 11, wherein the determined second display position of the corresponding portion of the commonly-displayed object is based on a positional relationship between a center point of the plurality of objects and a center point of the selected display area.

13. A non-transitory computer-readable storage medium having embodied thereon a program, which when executed by a computer, causes the computer to execute an information processing method, the method comprising:
determining a commonly-displayed object, from among a plurality of objects included in a selected content item, and wherein the commonly-displayed object is commonly displayed before and after a display state is changed;
determining a display position of the commonly-displayed object on a display screen after an operation of changing the display state based on a direction of the operation; and an image generating section configured to generate a display image including the commonly-displayed object at the determined display position, wherein each object of the plurality of objects included in the selected content item is displayed in a respective display area of a plurality of display areas on the display screen and an entire portion of the commonly-displayed object is displayed when all of the display areas included in the content item are displayed, and when the display state of the content item is changed to display a selected display area from among the plurality of display areas, a corresponding portion of the commonly-displayed object is displayed on the display screen at the determined second display position.

14. The information processing device according to claim 13, wherein the determined second display position of the corresponding portion of the commonly-displayed object is based on a positional relationship between a center point of the plurality of objects and a center point of the selected display area.

* * * * *